United States Patent
Liu et al.

(10) Patent No.: US 12,095,563 B2
(45) Date of Patent: Sep. 17, 2024

(54) FEEDBACK FOR NETWORK CODED SIDELINK RETRANSMISSIONS

(71) Applicant: QUALCOMM Incorporated, San Diego, CA (US)

(72) Inventors: Guangyi Liu, San Diego, CA (US); Gabi Sarkis, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/643,967

(22) Filed: Dec. 13, 2021

(65) Prior Publication Data
US 2023/0188260 A1 Jun. 15, 2023

(51) Int. Cl.
*H04L 1/08* (2006.01)
*H04L 5/00* (2006.01)
*H04W 92/18* (2009.01)

(52) U.S. Cl.
CPC .............. *H04L 1/08* (2013.01); *H04L 5/0055* (2013.01); *H04W 92/18* (2013.01)

(58) Field of Classification Search
CPC ....... H04L 1/08; H04L 5/0055; H04L 1/0033; H04L 1/0057; H04L 2001/0092; H04L 1/1893; H04W 92/18

USPC .......................................................... 370/329
See application file for complete search history.

(56) References Cited

U.S. PATENT DOCUMENTS

2020/0220694 A1\* 7/2020 Khoryaev ............. H04W 28/04
2020/0228247 A1\* 7/2020 Guo ..................... H04W 52/383
2022/0322296 A1\* 10/2022 Yu ......................... H04L 1/1861

\* cited by examiner

*Primary Examiner* — Mang Hang Yeung
(74) *Attorney, Agent, or Firm* — Kevin M. Donnelly; Harrity & Harrity, LLP

(57) ABSTRACT

Various aspects of the present disclosure generally relate to wireless communication. In some aspects, an encoder device may transmit a network coded sidelink retransmission that is associated with a set of transport blocks (TBs), the set of TBs associated with one or more sidelink transmissions. The encoder device may receive, from one or more user equipments (UEs), first feedback information, associated with the network coded sidelink retransmission, that indicates whether the one or more UEs successfully decoded the set of TBs. The encoder device may transmit, to a base station, second feedback information associated with the network coded sidelink retransmission that is based at least in part on the first feedback information. Numerous other aspects are provided.

30 Claims, 14 Drawing Sheets

FEEDBACK FOR NETWORK CODED SIDELINK RETRANSMISSIONS

FIELD OF THE DISCLOSURE

Aspects of the present disclosure generally relate to wireless communication and specifically, to techniques and apparatuses for feedback for network coded sidelink retransmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some cases, a base station may determine packets or transport blocks (TBs) that are to be included in a network coded retransmission for sidelink communication. For example, in a Mode 1 transmission mode, where sidelink resource selection or scheduling is performed by a base station, the base station may coordinate user equipments (UEs), roadside units (RSUs), and encoding devices in a sidelink network. In such examples, the base station may determine data, such as packets or TBs, that are to be retransmitted. For example, the base station may receive feedback from one or more UEs indicating sidelink communications associated with an erasure or a failed transmission. In some cases, another device (such as an encoder device), rather than the base station, may transmit a network coded sidelink retransmission that combines data from the sidelink communications associated with an erasure or a failed transmission. However, because the network coded sidelink retransmission is transmitted by another device (for example, rather than by the base station) the base station may not receive feedback associated with the transmission of the network coded sidelink retransmission. For example, the base station may be unaware of whether TBs or packets included in the network coded sidelink retransmission have been successfully decoded by UEs in the sidelink network. As a result, the base station may be unable to select resources accurately or efficiently for sidelink communications or schedule UEs to communicate sidelink communications (for example, because the base station is unaware of whether the UEs have successfully received or decoded TBs or packets included in network coded sidelink retransmissions).

SUMMARY

Some aspects described herein relate to an encoder device for wireless communication. The encoder device may include at least one processor and at least one memory, communicatively coupled with the at least one processor, that stores processor-readable code. The processor-readable code, when executed by the at least one processor, may be configured to cause the encoder device to transmit a network coded sidelink retransmission that is associated with a set of transport blocks (TBs), the set of TBs associated with one or more sidelink transmissions. The processor-readable code, when executed by the at least one processor, may be configured to cause the encoder device to receive, from one or more user equipments (UEs), first feedback information, associated with the network coded sidelink retransmission, that indicates whether the one or more UEs successfully decoded the set of TBs. The processor-readable code, when executed by the at least one processor, may be configured to cause the encoder device to transmit, to a base station, second feedback information associated with the network coded sidelink retransmission that is based at least in part on the first feedback information.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit, to an encoder device, an indication of a set of TBs to be encoded for a network coded sidelink retransmission. The processor-readable code, when executed by the at least one processor, may be configured to cause the base station to receive, from the encoder device or a UE, feedback information associated with the network coded sidelink retransmission that indicates whether the one or more UEs, included the UE, successfully decoded the set of TBs.

Some aspects described herein relate to a method of wireless communication performed by an encoder device. The method may include transmitting a network coded sidelink retransmission that is associated with a set of TBs, the set of TBs associated with one or more sidelink transmissions. The method may include receiving, from one or more UEs, first feedback information, associated with the network coded sidelink retransmission, that indicates whether the one or more UEs successfully decoded the set of TBs. The method may include transmitting, to a base station, second feedback information associated with the network coded sidelink retransmission that is based at least in part on the first feedback information.

Some aspects described herein relate to a method of wireless communication performed by a base station. The method may include transmitting, to an encoder device, an indication of a set of TBs to be encoded for a network coded sidelink retransmission. The method may include receiving, from the encoder device or a UE, feedback information associated with the network coded sidelink retransmission that indicates whether the one or more UEs, included the UE, successfully decoded the set of TBs.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive, from an encoder device, a network coded sidelink retransmission that includes a set of TBs, the set of TBs associated with one or more sidelink transmissions. The processor-readable code, when executed by the at least one processor, may be configured to cause the user equipment to transmit, to a base station, feedback information associated with one or more TBs included in the set of TBs.

Some aspects described herein relate to a method of wireless communication performed by a UE. The method may include receiving, from an encoder device, a network coded sidelink retransmission that includes a set of TBs, the set of TBs associated with one or more sidelink transmissions. The method may include transmitting, to a base station, feedback information associated with one or more TBs included in the set of TBs.

Some aspects described herein relate to a non-transitory computer-readable medium that stores a set of instructions for wireless communication by a one or more instructions that, when executed by one or more processors of an encoder device. The set of instructions, when executed by one or more processors of the one or more instructions that, when executed by one or more processors of an encoder device, may cause the one or more instructions that, when executed by one or more processors of an encoder device to transmit a network coded sidelink retransmission that is associated with a set of TBs, the set of TBs associated with one or more sidelink transmissions. The set of instructions, when executed by one or more processors of the one or more instructions that, when executed by one or more processors of an encoder device, may cause the one or more instructions that, when executed by one or more processors of an encoder device to receive, from one or more UEs, first feedback information, associated with the network coded sidelink retransmission, that indicates whether the one or more UEs successfully decoded the set of TBs. The set of instructions, when executed by one or more processors of the one or more instructions that, when executed by one or more processors of an encoder device, may cause the one or more instructions that, when executed by one or more processors of an encoder device to transmit, to a base station, second feedback information associated with the network coded sidelink retransmission that is based at least in part on the first feedback information.

Some aspects described herein relate to a non-transitory computer-readable medium that stores a set of instructions for wireless communication by a base station. The set of instructions, when executed by one or more processors of the base station, may cause the base station to transmit, to an encoder device, an indication of a set of TBs to be encoded for a network coded sidelink retransmission. The set of instructions, when executed by one or more processors of the base station, may cause the base station to receive, from the encoder device or a UE, feedback information associated with the network coded sidelink retransmission that indicates whether the one or more UEs, included the UE, successfully decoded the set of TBs.

Some aspects described herein relate to a non-transitory computer-readable medium that stores a set of instructions for wireless communication by a UE. The set of instructions, when executed by one or more processors of the UE, may cause the UE to receive, from an encoder device, a network coded sidelink retransmission that includes a set of TBs, the set of TBs associated with one or more sidelink transmissions. The set of instructions, when executed by one or more processors of the UE, may cause the UE to transmit, to a base station, feedback information associated with one or more TBs included in the set of TBs.

Some aspects described herein relate to an apparatus for wireless communication. The apparatus may include means for transmitting a network coded sidelink retransmission that is associated with a set of TBs, the set of TBs associated with one or more sidelink transmissions. The apparatus may include means for receiving, from one or more UEs, first feedback information, associated with the network coded sidelink retransmission, that indicates whether the one or more UEs successfully decoded the set of TBs. The apparatus may include means for transmitting, to a base station, second feedback information associated with the network coded sidelink retransmission that is based at least in part on the first feedback information.

Some aspects described herein relate to an apparatus for wireless communication. The apparatus may include means for transmitting, to an encoder device, an indication of a set of TBs to be encoded for a network coded sidelink retransmission. The apparatus may include means for receiving, from the encoder device or a UE, feedback information associated with the network coded sidelink retransmission that indicates whether the one or more UEs, included the UE, successfully decoded the set of TBs.

Some aspects described herein relate to an apparatus for wireless communication. The apparatus may include means for receiving, from an encoder device, a network coded sidelink retransmission that includes a set of TBs, the set of TBs associated with one or more sidelink transmissions. The apparatus may include means for transmitting, to a base station, feedback information associated with one or more TBs included in the set of TBs.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
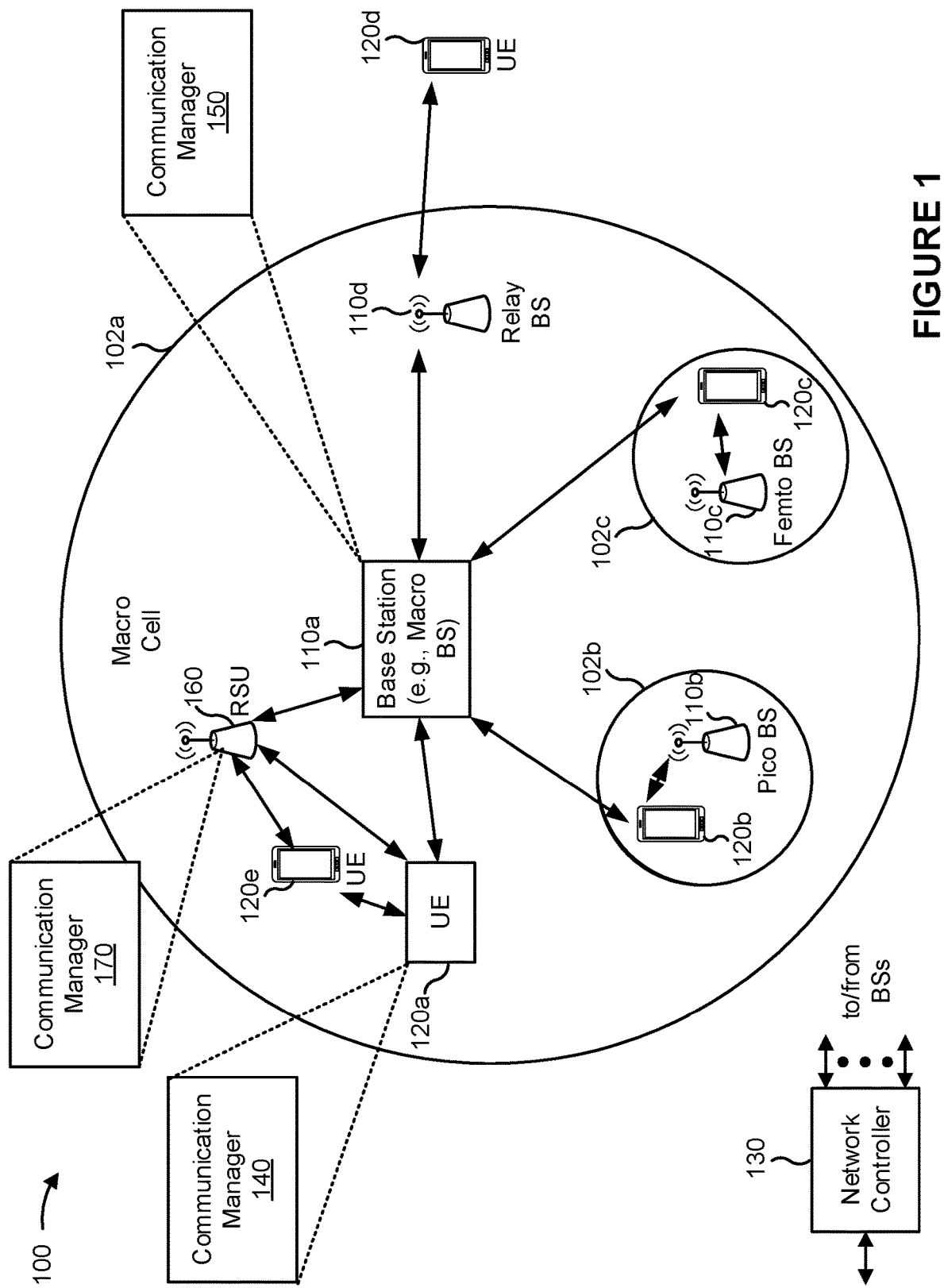
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to feedback for network coded sidelink retransmissions. Some aspects more specifically relate to an encoder device transmitting, to a base station, feedback information associated with the network coded sidelink retransmission that is based at least in part on feedback information received, by the encoder device, from one or more user equipments (UEs). For example, the encoder device may transmit, to the UEs, the network coded sidelink retransmission. The encoder device may receive, from the UEs, feedback information associated with the network coded sidelink retransmission, that indicates whether the one or more UEs successfully decoded a set of transport blocks (TBs) associated with the network coded sidelink retransmission. The encoder device may transmit, to the base station, feedback information associated with the network coded sidelink retransmission that is based at least in part on the feedback information received from the UEs. In other words, the encoder device may collect or aggregate feedback associated with a network coded sidelink retransmission and may transmit the collected or aggregated feedback to the base station (for example, the base station that performs sidelink resource selection or scheduling for the UEs).

In some aspects, the feedback information transmitted by the encoder device to the base station may be full feedback information that provides information for each TB associated with the network coded sidelink retransmission and each receiver (for example, each UE) associated with the network coded sidelink retransmission. For example, the feedback information may include, for each TB, a separate indication for each UE associated with the network coded sidelink retransmission, indicating whether the UE successfully decoded the TB. In some other aspects, the feedback information transmitted by the encoder device to the base station may be partial feedback information that provides information for each TB associated with the network coded sidelink retransmission, but not all receivers associated with the network coded sidelink retransmission. For example, the feedback information transmitted by the encoder device may include a single indication (for example, a single bit) for each TB associated with the network coded sidelink retransmission, where the single indication indicates whether at least one of the UEs successfully decoded the TB. In some other aspects, the feedback information transmitted by the encoder device to the base station may include a single indication (for example, a single bit) that indicates whether all TBs associated with the network coded sidelink retransmission (for example, the entire set of TBs) were successfully decoded. Additionally or alternatively, the UEs associated with the network coded sidelink transmission may transmit, directly to the base station, feedback information associated with the network coded sidelink retransmission.

Particular aspects of the subject matter described in this disclosure can be implemented to realize one or more of the following potential advantages. In some examples, the described techniques can be used to enable a base station to efficiently and accurately manage sidelink communications based on receiving feedback information associated with a network coded sidelink retransmission that is transmitted by another device (such as an encoder device). As a result of receiving the feedback information for the network coded sidelink retransmission, the base station may be enabled to make improved scheduling determinations and resource allocations for sidelink communications. For example, the base station may determine additional network coded sidelink retransmissions (for example, the base station may determine TBs to be included in the additional network coded sidelink retransmissions), determine TBs or packets that need to be retransmitted, or determine resource allocations for future sidelink transmissions or retransmissions, among other examples.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices.

Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

In some examples, an RSU 160 may communicate with a base station 110 (for example, using an uplink or a downlink). The RSU 160 may communicate with one or more UEs 120 directly using one or more sidelink channels (for example, without using a base station 110 as an intermediary to communicate with one another). In some examples, the RSU 160 may be physically mounted along a road or pedestrian passageway. In other words, the RSU 160 may be stationary. For example, the RSU 160 may be a dedicated short range communications (DSRC) transceiver that is mounted along a road or pedestrian passageway. In some examples, the RSU 160 may be a UE 120. The RSU 160 may be an example of an encoder device that is described in more detail elsewhere herein.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the RSU 160 may include a communication manager 170. As described in more detail elsewhere herein, the communication manager 170 may transmit a network coded sidelink retransmission that is associated with a set of TBs, the set of TBs associated with one or more sidelink transmissions; receive, from one or more UEs, first feedback information, associated with the network coded sidelink retransmission, that indicates whether the one or more UEs successfully decoded the set of TBs; and transmit, to a base station, second feedback information associated with the network coded sidelink retransmission that is based at least in part on the first feedback information. Additionally or alternatively, the communication manager 170 may perform one or more other operations described herein.

In some aspects, the base station 110 may include a communication manager 150. As described in more detail elsewhere herein, the communication manager 150 may transmit, to an encoder device, an indication of a set of TBs to be encoded for a network coded sidelink retransmission; and receive, from the encoder device or a UE, feedback information associated with the network coded sidelink retransmission that indicates whether the one or more UEs, included the UE, successfully decoded the set of TBs. Additionally or alternatively, the communication manager 150 may perform one or more other operations described herein.

In some aspects, the UE 120 may include a communication manager 140. As described in more detail elsewhere herein, the communication manager 140 may receive, from an encoder device, a network coded sidelink retransmission that includes a set of TBs, the set of TBs associated with one or more sidelink transmissions; and transmit, to a base station, feedback information associated with one or more TBs included in the set of TBs. Additionally or alternatively, the communication manager 140 may perform one or more other operations described herein.

Figure 2:
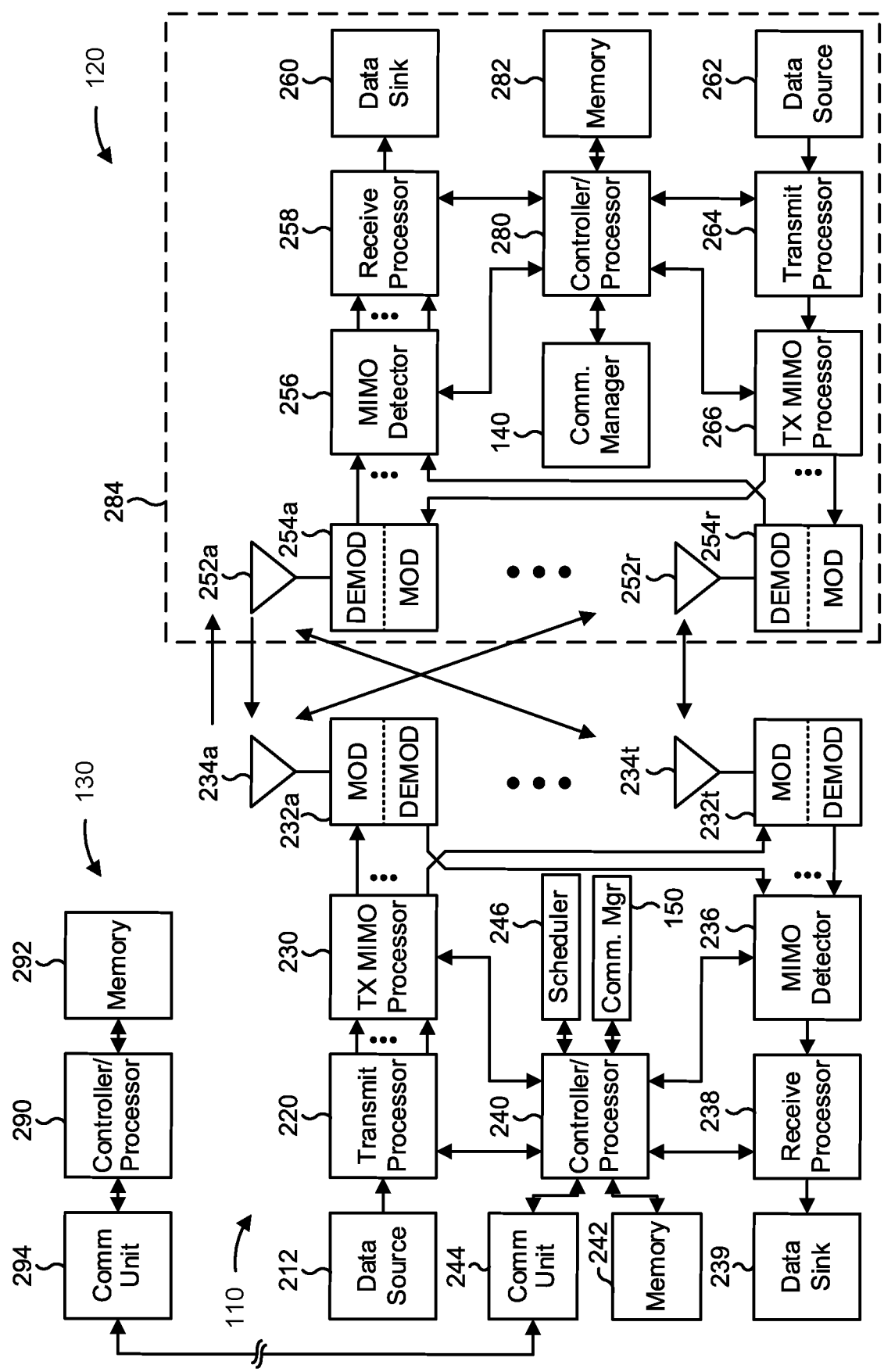
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with feedback for network coded sidelink retransmissions, as described in more detail elsewhere herein. In some aspects, the encoder device described herein is the UE 120, is included in the UE 120, or includes one or more components of the UE 120 shown in FIG. 2. In some aspects, the encoder device described herein is the RSU 160, is included in the RSU 160, or includes one or more components of the RSU 160.

Figure 9:
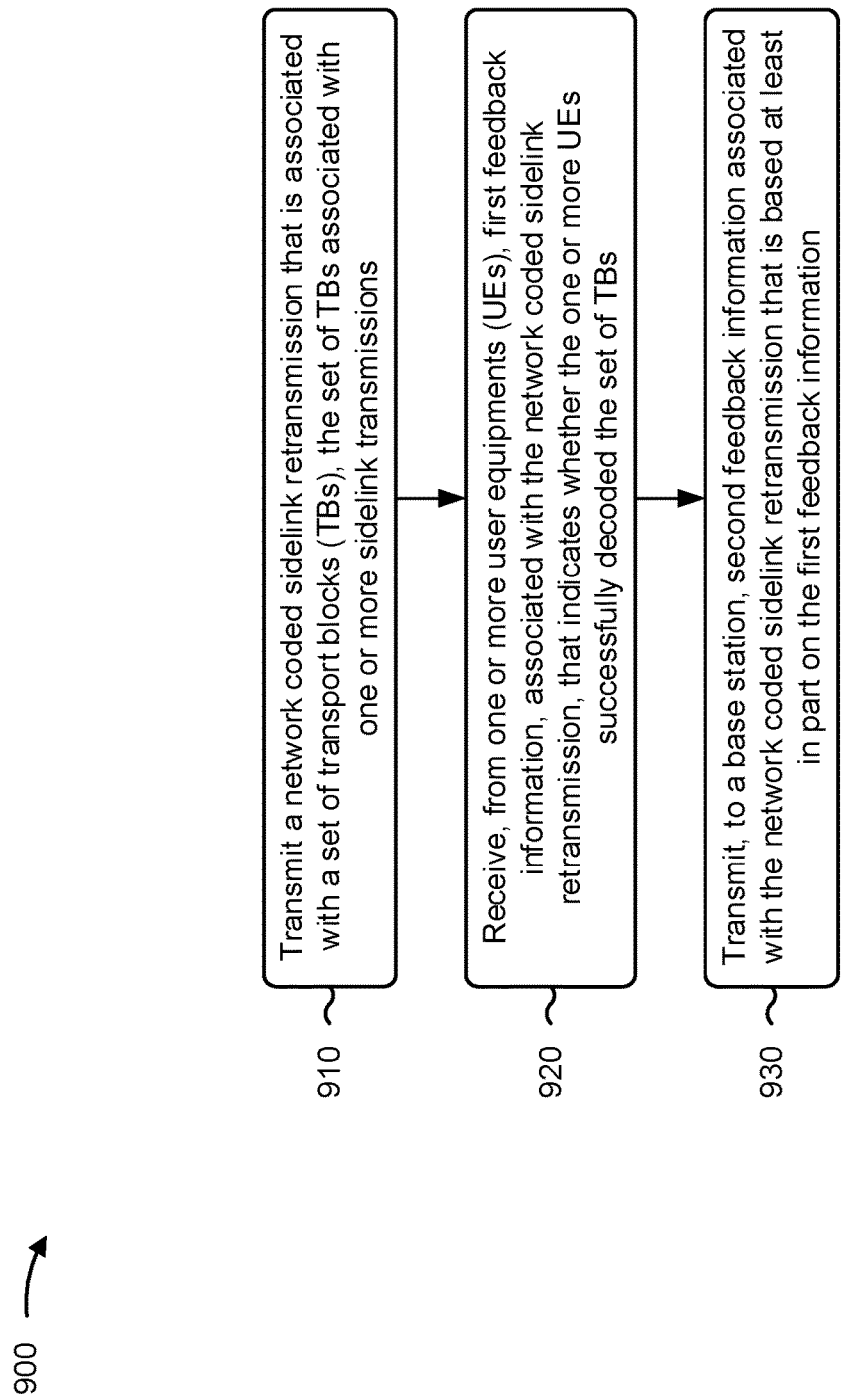
FIG. 9 is a flowchart illustrating an example process performed, for example, by an encoder device, associated with feedback for network coded sidelink retransmissions, in accordance with the present disclosure.
Figure 10:
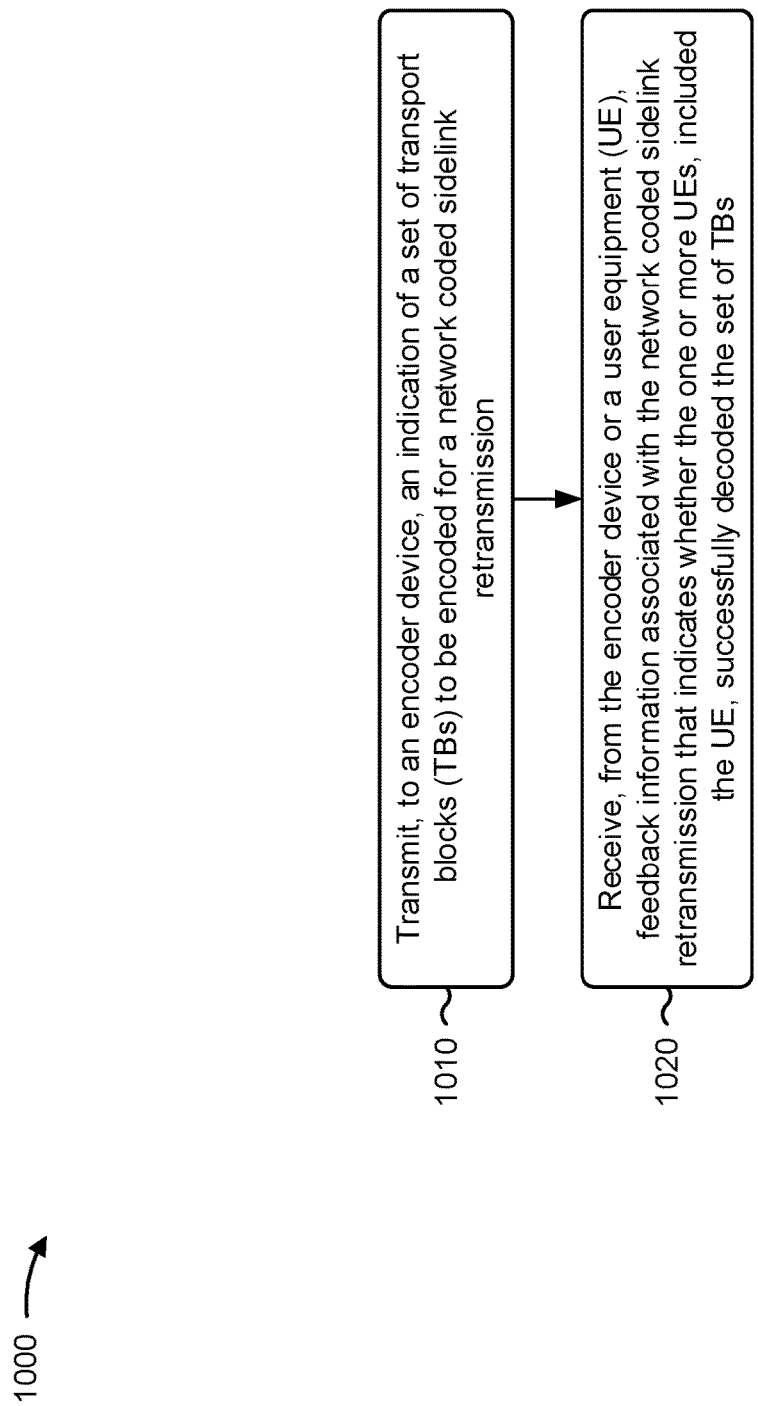
FIG. 10 is a flowchart illustrating an example process performed, for example, by a base station, associated with feedback for network coded sidelink retransmissions, in accordance with the present disclosure.
Figure 11:
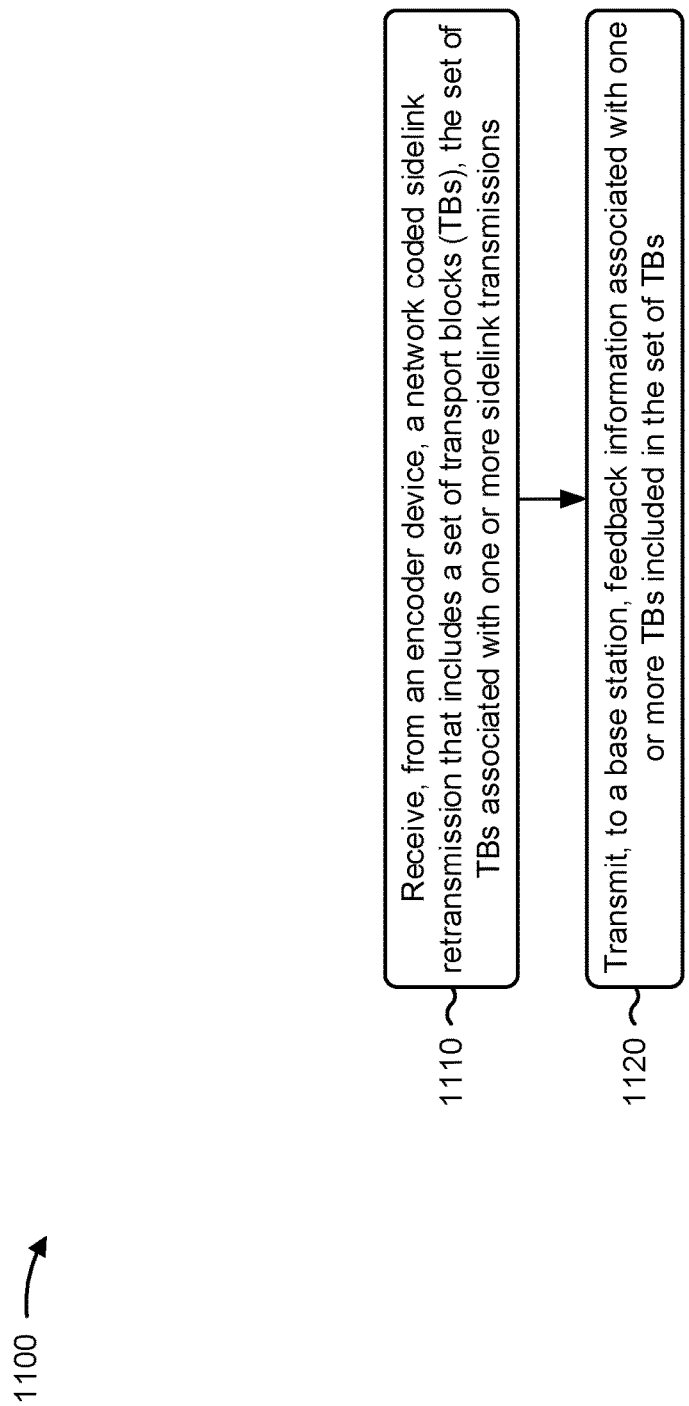
FIG. 11 is a flowchart illustrating an example process performed, for example, by a UE, associated with feedback for network coded sidelink retransmissions, in accordance with the present disclosure.

For example, the controller/processor 240 of the base station 110, the controller/processor 280 of the UE 120, or any other component(s) of FIG. 2 may perform or direct operations of, for example, process 900 of FIG. 9, process 1000 of FIG. 10, process 1100 of FIG. 11, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, process 1100 of FIG. 11, or other processes as described herein. In some examples, executing instructions may include running the instructions, converting the instructions, compiling the instructions, or interpreting the instructions, among other examples.

In some aspects, the encoder device includes means for transmitting a network coded sidelink retransmission that is associated with a set of TBs, the set of TBs associated with one or more sidelink transmissions; means for receiving, from one or more UEs, first feedback information, associated with the network coded sidelink retransmission, that indicates whether the one or more UEs successfully decoded the set of TBs; or means for transmitting, to a base station, second feedback information associated with the network coded sidelink retransmission that is based at least in part on the first feedback information. In some aspects, the means for the encoder device to perform operations described herein may include, for example, one or more of communication manager 170, antenna 252, modem 254, MIMO detector 256, receive processor 258, transmit processor 264, TX MIMO processor 266, controller/processor 280, or memory 282.

In some aspects, the base station 110 includes means for transmitting, to an encoder device, an indication of a set of TBs to be encoded for a network coded sidelink retransmission; or means for receiving, from the encoder device or a UE, feedback information associated with the network coded sidelink retransmission that indicates whether the one or more UEs, included the UE, successfully decoded the set of TBs. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving, from an encoder device, a network coded sidelink retransmission that includes a set of TBs, the set of TBs associated with one or more sidelink transmissions; or means for transmitting, to a base station, feedback information associated with one or more TBs included in the set of TBs. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
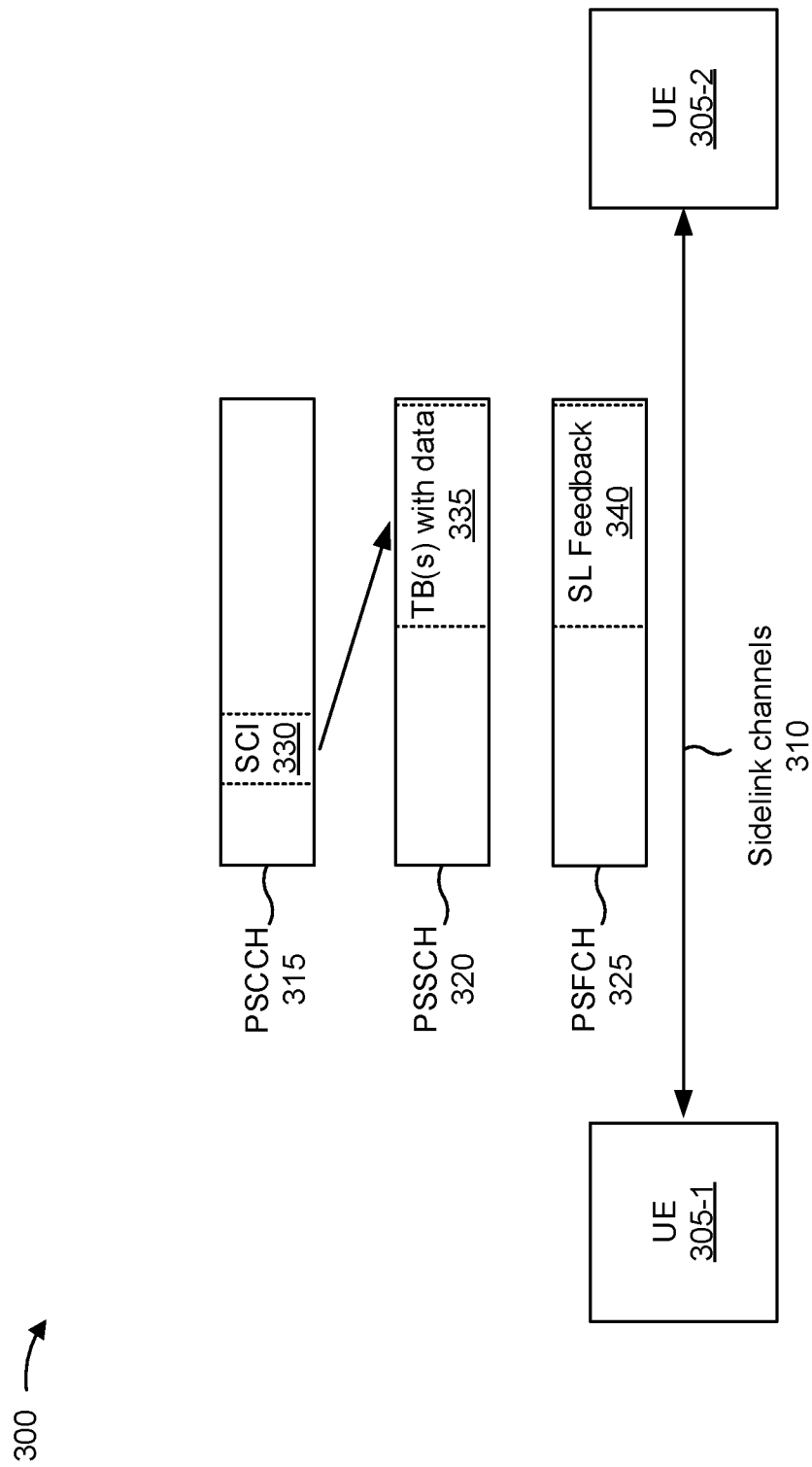
FIG. 3 is a diagram illustrating an example of sidelink communications, in accordance with the present disclosure.

FIG. 3 is a diagram illustrating an example of sidelink communications 300, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, or V2P communications) or mesh networking. In some examples, the UEs 305 (for example, UE 305-1 or UE 305-2) may correspond to one or more other UEs described elsewhere herein, such as UE 120. In some examples, the one or more sidelink channels 310 may use a PC5 interface or may operate in a high frequency band (for example, the 5.9 GHz band). Additionally or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, or a physical sidelink feedback channel (PSFCH) 325. The PSCCH 315 may be used to communicate control information, similar to a physical downlink control channel (PDCCH) or a physical uplink control channel (PUCCH) used for cellular communications with a base station 110 via an access link or an access channel. The PSSCH 320 may be used to communicate data, similar to a physical downlink shared channel (PDSCH) or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (for example, time resources, frequency resources, or spatial resources) where a TB 335 may be carried on the PSSCH 320. The TB 335 may include data. The PSFCH 325 may be used to communicate sidelink feedback 340, such as hybrid automatic repeat request (HARQ) feedback (for example, ACK/NACK information), transmit power control (TPC), or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (for example, time resources, frequency resources, or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, or an MCS. The SCI-2 may include information associated with data transmissions on the PSSCH 320, such as a HARQ process ID, a new data indicator (NDI), a source identifier, a destination identifier, or a channel state information (CSI) report trigger.

In some examples, the one or more sidelink channels 310 may use resource pools. For example, a scheduling assignment (for example, included in SCI 330) may be transmitted in sub-channels using specific resource blocks (RBs) across time. In some examples, data transmissions (for example, on the PSSCH 320) associated with a scheduling assignment may occupy adjacent RBs in the same subframe as the scheduling assignment (for example, using frequency division multiplexing). In some examples, a scheduling assignment and associated data transmissions are not transmitted on adjacent RBs.

In some examples, a UE 305 may operate using a sidelink transmission mode (for example, Mode 1) where resource selection or scheduling is performed by a base station 110. For example, the UE 305 may receive a grant (for example, in downlink control information (DCI) or in a radio resource control (RRC) message, such as for configured grants) from the base station 110 for sidelink channel access or scheduling. In some examples, a UE 305 may operate using a transmission mode (for example, Mode 2) where resource selection or scheduling is performed by the UE 305 (for example, rather than a base station 110). In some examples, the UE 305 may perform resource selection or scheduling by sensing channel availability for transmissions. For example, the UE 305 may measure an RSSI parameter (for example, a sidelink-RSSI (S-RSSI) parameter) associated with various sidelink channels, may measure an RSRP parameter (for example, a PSSCH-RSRP parameter) associated with various sidelink channels, or may measure an RSRQ parameter (for example, a PSSCH-RSRQ parameter) associated with various sidelink channels, and may select a channel for transmission of a sidelink communication based at least in part on the measurement(s).

Additionally or alternatively, the UE 305 may perform resource selection or scheduling using SCI 330 received in the PSCCH 315, which may indicate occupied resources or channel parameters. Additionally or alternatively, the UE 305 may perform resource selection or scheduling by determining a channel busy rate (CBR) associated with various sidelink channels, which may be used for rate control (for example, by indicating a maximum quantity of resource blocks that the UE 305 can use for a particular set of subframes).

In the transmission mode where resource selection or scheduling is performed by a UE 305, the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally or alternatively, the UE 305 may generate a sidelink grant for event-driven scheduling, such as for an on-demand sidelink message.

In some cases, a sidelink communication may become corrupted (for example, as a result of a transmission error). This corruption may be referred to as an "erasure" of the communication. The sidelink communication may be retransmitted by a network node, such as a base station or a UE (for example, an RSU), using network coding. The network node may be referred to herein as an "encoder device." The UE 305 may be configured to recover the erased communication based at least in part on the retransmission using network coding, as explained in more detail elsewhere herein.

Figure 4:
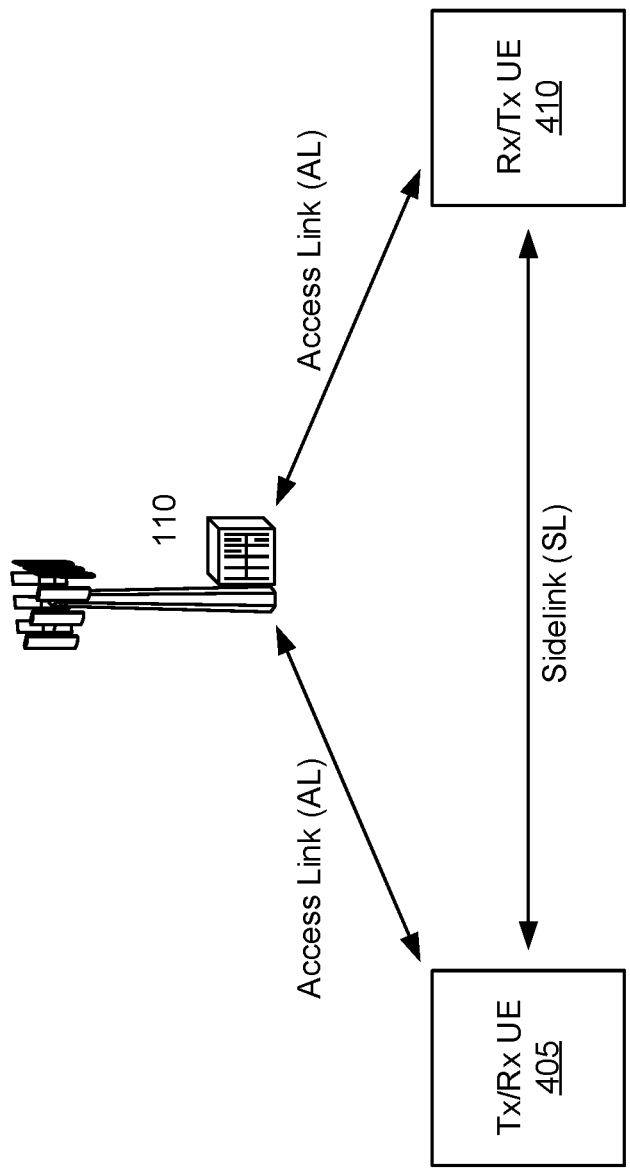
FIG. 4 is a diagram illustrating an example of sidelink communications and access link communications, in accordance with the present disclosure.

FIG. 4 is a diagram illustrating an example of sidelink communications and access link communications 400, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link.

Additionally or alternatively, in some sidelink modes, the base station 110 may communicate with the Rx/Tx UE 410 via a second access link. The Tx/Rx UE 405 or the Rx/Tx UE 410 may correspond to one or more UEs described elsewhere herein, such as the UE 120 of FIG. 1. Thus, a direct link between UEs 120 (for example, via a PC5 interface) may be referred to as a sidelink, and a direct link between a base station 110 and a UE 120 (for example, via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Figure 5:
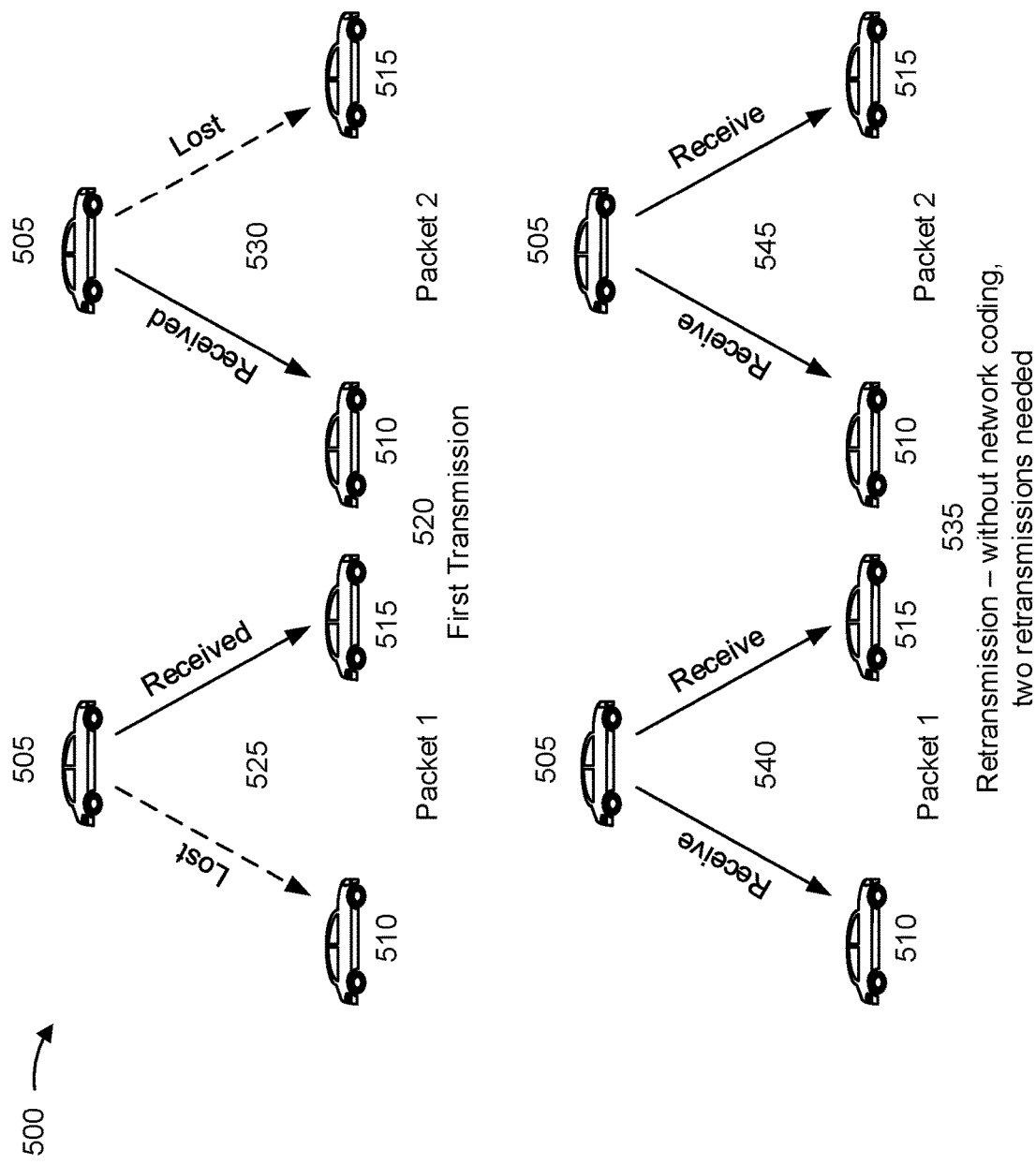
FIG. 5 is a diagram illustrating an example of sidelink communications without using network coding, in accordance with the present disclosure.

FIG. 5 is a diagram illustrating an example of sidelink communications 500 without using network coding, in accordance with the present disclosure. As shown in FIG. 5, a UE, such as a transmitting UE 505, may transmit communications to one or more receiving UEs, and may be associated with an RSU, a network node, or a base station, among other examples. For example, the transmitting UE 505 may transmit one or more communications to a first receiving UE 510 associated with a first receiving vehicle and a second receiving UE 515 associated with a second receiving vehicle. In some examples, the transmitting UE 505 may relay one or more communications received from an originating UE (not shown) to the first receiving UE 510 and to the second receiving UE 515. The UEs 505, 510, or 515 may correspond to one or more UEs described elsewhere herein, such as the UE 120 or the UE 305.

In a first operation 520, in a first transmission, the transmitting UE 505 may transmit a first communication and a second communication to a first receiving UE 510 associated with a first receiving vehicle and to a second receiving UE 515 associated with a second receiving vehicle. In some examples, the communications may be P2P communications, such as sidelink communications. Additionally or alternatively, the communications may include packets. For example, the first communication may be a P2P communication that includes a first packet (for example, "Packet 1") and the second communication may be a second P2P communication that includes a second packet (for example, "Packet 2"). However, the communications are not limited to P2P communications, and are not limited to including packets, and may be any type of communication. In a second operation 525, the first receiving UE 510 may fail to receive the first communication, and the second receiving UE 515 may receive the first communication. In a third operation 530, the first receiving UE 510 may receive the second communication, and the second receiving UE 515 may fail to receive the second communication.

In a fourth operation 535, if the transmitting UE 505 does not use network coding, then the transmitting UE 505 may retransmit both the first communication and the second communication (for example, for a total of two retransmissions). For example, in a fifth operation 540, the transmitting UE 505 may retransmit the first communication because the first receiving UE 510 previously failed to receive the first communication. Furthermore, in a sixth operation 545, the transmitting UE 505 may retransmit the second communication because the second receiving UE 515 previously failed to receive the second communication.

As described in more detail below, network coding may be used to combine communications, thereby reducing the quantity of required retransmissions. Network coding may provide advantages associated with retransmission without increasing network load or interference, thereby improving network performance.

Figure 6:
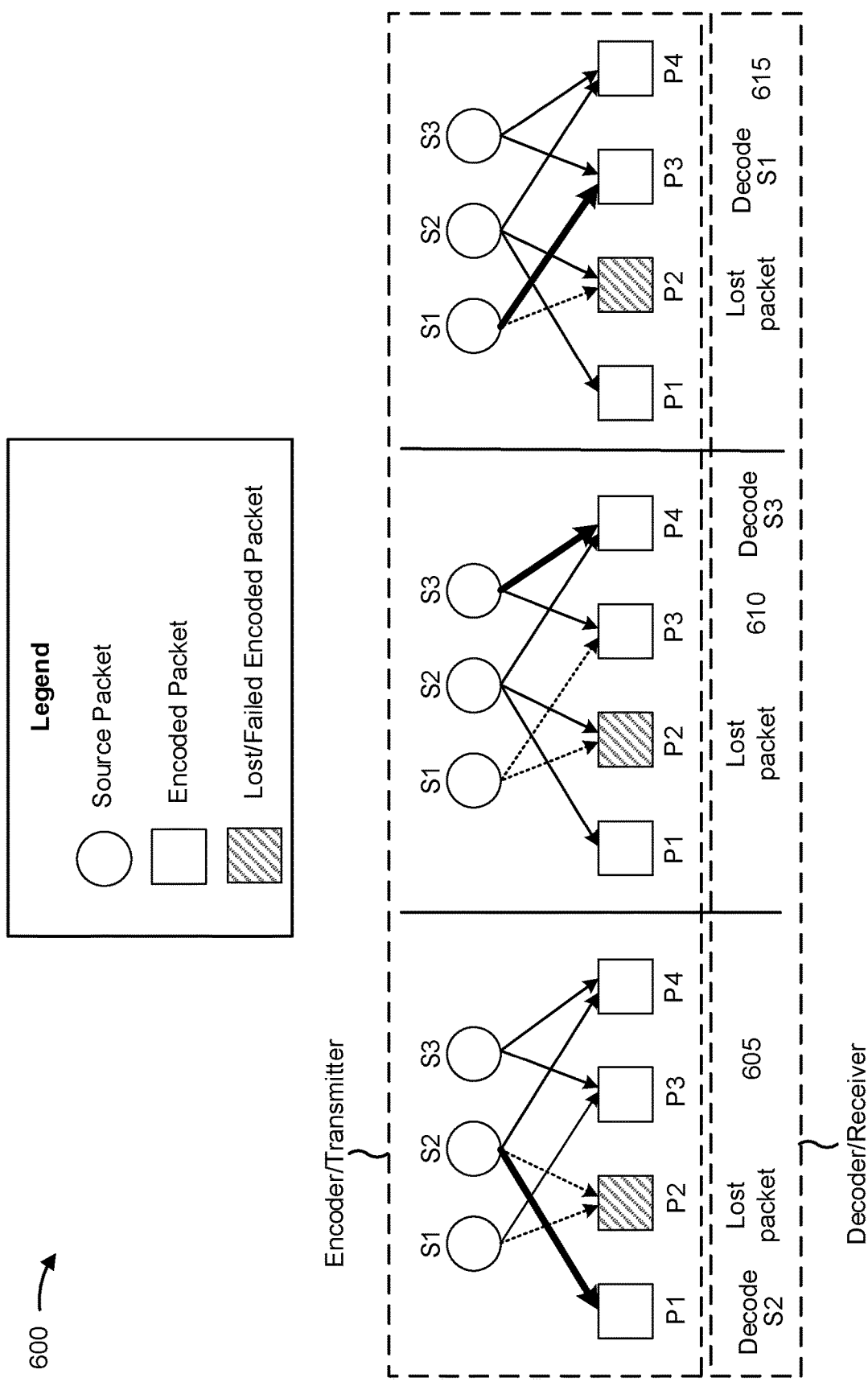
FIG. 6 is a diagram illustrating an example of network coding, in accordance with the present disclosure.

FIG. 6 is a diagram illustrating an example of network coding 600, in accordance with the present disclosure. As shown in FIG. 6, an encoder device (or transmitter) may communicate with a decoder device (or receiver). The encoder device is sometimes also referred to as a transmitter, an encoder node, or a transmitter node. The encoder may include a UE 120, a base station 110, an RSU, or an integrated access and backhaul (IAB) device, among other examples. An IAB device may include an IAB donor (for example, a central unit (CU) of an IAB donor or a distributed unit (DU) of an IAB donor) or an IAB node (for example, a DU of an IAB node or a mobile termination (MT) of an IAB node). The decoder device is sometimes also referred to as a receiver, a decoder node, or a receiver node. The decoder device may include a UE 120, a base station 110, an RSU, or an IAB device, among other examples.

As shown in FIG. 6, an encoder device (or transmitter) may encode data, shown as a set of source packets or original packets (p1, p2, and p3), into a set of encoded packets using network coding. While the example of FIG. 6 uses packets as example data, the data may include any type of communication (for example, TBs), and is not limited to packets. An encoded packet may be the same as a source packet, may be a redundancy version of a source packet, may include a combination of multiple source packets (for example, a subset of the source packets), or may include a redundancy version of the combination. The quantity of encoded packets may be the same as or different than the quantity of source packets. In some examples, the quantity of encoded packets may be unlimited (for example, the encoder device may generate any quantity of encoded packets), such as when using a rateless network coding scheme. For example, as shown in FIG. 6, the encoder device may encode K source packets (where K=3) into N encoded packets (where N=4). The encoder device transmits the encoded packets to a decoder device (or receiver). The decoder device uses network coding to decode the encoded packets and recover the source packets. As used herein, network coding may be performed using any type of network coding scheme, such as fountain coding, linear network coding, random linear network coding, Luby transform (LT) network coding, or Raptor network coding, among other examples.

As further shown in FIG. 6, the encoder device encodes three source packets (S1, S2, and S3) into four encoded packets: P1 (for example, that carries S2), P2 (for example, that carries S1+S2), P3 (for example, that carries S1+S3), and P4 (for example, that carries S2+S3). The encoder device may transmit the four encoded packets to the decoder device. In this example, the packet P2 (carrying S1+S2) is not successfully received by the decoder. In a first operation 605, the decoder device decodes the packet P1 (carrying S2). In a second operation 610, the decoder device obtains S3 from the packet P4 (carrying S2+S3) because the decoder device has already decoded S2 and can use combining to obtain S3 from S2+S3. In a third operation 615, the decoder device obtains S1 from the packet P3 (carrying S1+S3) because the decoder device has already decoded S3 and can use combining to obtain S1 from S1+S3. In some examples, an encoded packet may include an indication (for example, in a header of the encoded packet) that indicates the source packet(s) that are included in the encoded packet. Thus, the decoder device can obtain 51, S2, and S3 despite P2 failing, and using less overhead than packet data convergence protocol (PDCP) duplication. For example, PDCP duplication may duplicate all of the source packets for a total of six transmissions, while the example network coding shown in FIG. 6 uses four transmissions.

In some cases, the encoder device may continue to transmit encoded packets (for example, the same combination of encoded packets or different combinations of encoded packets) to the decoder device until the encoder device receives a notification from the decoder device. For example, the decoder device may successfully receive the source packets or may abort decoding, which may trigger the decoder device to send a notification to the encoder device. The notification may include, for example, an ACK or a stop message (STOP). In some cases, the decoder device may transmit an ACK for each original packet that is successfully received. Additionally or alternatively, the decoder device may transmit an ACK upon successful reception of all of the source packets. Upon receiving the notification, the encoder device may encode additional data (for example, a new set of source packets, such as S4, S5, and S6), and may transmit encoded packets to the decoder, in a similar manner as described above, until all of the data has been transmitted or successfully received. Alternatively, to conserve network resources and reduce overhead, the encoder device may not transmit an ACK or a NACK for received packets.

In some cases, such as when using a Raptor network coding scheme, the encoder device may perform inner coding, or precoding, to generate a set of intermediate packets, that include a set of redundant packets, from the source packets. A redundant packet may be a copy of a source packet or a redundancy version of a source packet. In some examples, a redundant packet may be a low density parity check (LDPC) packet. For example, the encoder device may apply inner coding to generate K' intermediate packets (for example, original plus redundant packets from K source packets). The encoder may then perform outer coding (for example, fountain coding or LT network coding) to generate N encoded packets from the K' intermediate packets, in a similar manner as described above. As a result, the encoding or decoding complexity of the Raptor network coding scheme may be linear. The encoded packets may include a set of systemic packets and a set of repair packets. In some examples, the decoder device may choose to not decode a packet included in the set of systematic symbols that has a high decoding complexity (for example, is associated with a high encoding degree or is associated with a high quantity of source packets). The decoder device may recover the source packets associated with the packet that is not decoded from one or more packets included in the set of repair packets. The one or more packets included in the set of repair packets may be associated with a lower decoding complexity. As a result, the decoding complexity may be reduced.

In some examples, the network coding may be viewed as a linear system (for example, over a Galois field) with three variables and four linearly independent constraints. For example, the three variables may correspond to the original packets (for example, p1, p2, and p3) and the four linearly independent constraints may correspond to the four encoded packets (for example, the four encoded packets that carry p2, p1+p2, p1+p3, and p2+p3). Using the linear system, any of the three variables that have been subject to an erasure (for example, a transmission error) may be recovered based at least in part on a portion of the three original packets and based at least in part on a portion of the four encoded packets. An example representation of the linear system is shown below:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T$$

where a, b, and c correspond to the three original packets, and T represents a transpose of the function.

Network coding and recovery may enable a UE to recover a communication that has been erased (for example, lost or corrupted) during transmission. The recovery of the erased communications, without requiring retransmission by the network node, may reduce the overall quantity of retransmissions by the network node and may reduce the overall load on the network.

Figure 7:
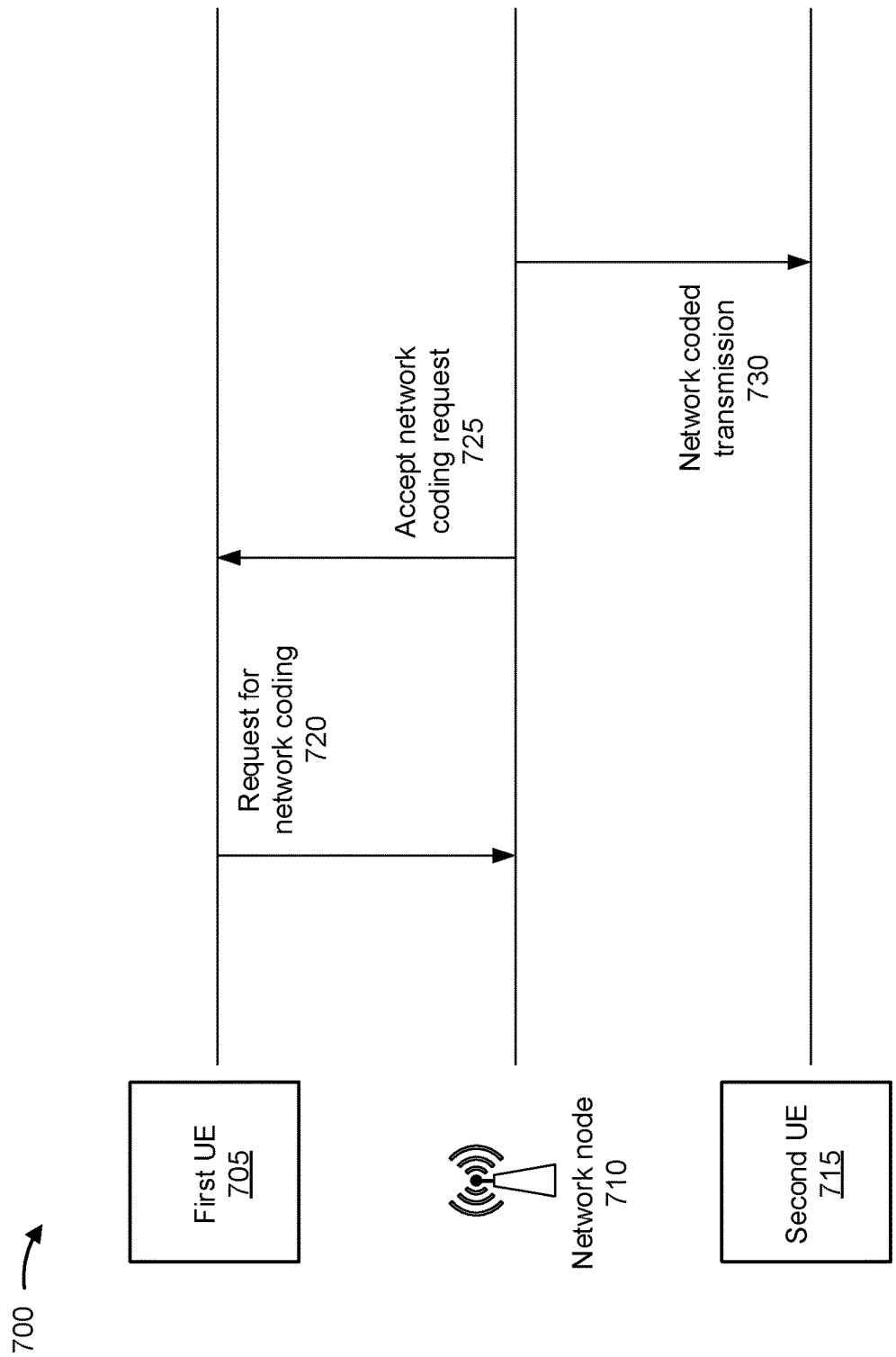
FIG. 7 is a diagram illustrating an example of network coding using a single encoder device, in accordance with the present disclosure.

FIG. 7 is a diagram illustrating an example of network coding 700 using a single encoder device, in accordance with the present disclosure. As shown in FIG. 7, a first UE 705 and a second UE 715 may be in communication with an encoder device 710. In some examples, the first UE 705 may be a transmitting UE associated with a first vehicle and the second UE 715 may be a receiving UE associated with a second vehicle. However, one or both of the first UE 705 and the second UE 715 may be configured to receive and transmit data. The encoder device 710 may be a base station, an RSU, a network node, or a UE, among other examples. The first UE 705, the encoder device 710, or the second UE 715 may correspond to one or more of the UEs described herein, such as UE 120, UE 305, UE 505, UE 510, or UE 515.

In a first operation 720, the first UE 705 may transmit, and the encoder device 710 may receive, a request for network coding. Network coding may be used to combine communications, such as by combining a first communication and a second communication in a similar manner as described elsewhere herein, such as in connection with FIG. 6. The first UE 705 may transmit the request for network coding to the encoder device 710 based at least in part on a configuration associated with the UE 705 or a configuration associated with the encoder device 710. For example, the first UE 705 may be configured to transmit all network coding requests to the encoder device 710. In some examples, the encoder device 710 may be the only encoder device within an area associated with the first UE 705 or may otherwise be the default encoder device to which the first UE 705 transmits all network coding requests.

In a second operation 725, the encoder device 710 may accept the network coding request. In some examples, the encoder device 710 may be the only encoder device configured to accept network coding requests from the first UE 705 or may be the default encoder device for performing network coding for the first UE 705. The encoder device 710 may transmit, and the first UE 705 may receive, an indication that the encoder device 710 has accepted the request to perform the network coding.

In a third operation 730, the encoder device 710 may transmit, and the second UE 715 may receive, a transmission using network coding. The transmission using network coding may include a function of the first communication and the second communication, such as a combination of the first communication and the second communication using an exclusive or (XOR) operation.

As described above (for example, in connection with FIG. 5), an encoder device may transmit a first communication and a second communication to a first receiving UE and a second receiving UE. The first receiving UE may fail to receive the first communication, but may receive the second communication, while the second receiving UE may receive the first communication, but may fail to receive the second communication. If the encoder device does not use network coding, then the encoder device may be required to retransmit both the first communication and the second communication (for example, for a total of two retransmissions). For example, the encoder device 710 may retransmit the first communication because the first receiving UE previously failed to receive the first communication, and may retransmit the second communication because the second receiving UE previously failed to receive the second P2P communication.

In contrast, if the encoder device 710 uses network coding to combine the communications, then the encoder device may only need to retransmit a single communication. In some examples, the single communication may be a combined communication that includes both the first communication and the second communication. Thus, the use of network coding may reduce the quantity of resources required for the retransmission, and thus reduce the overall load on the network.

In some cases, a base station may determine packets or TBs that are to be included in a network coded retransmission for sidelink communication. For example, in the Mode 1 transmission mode, where sidelink resource selection or scheduling is performed by a base station, the base station may coordinate UEs, RSUs, and encoding devices in a sidelink network. In such examples, the base station may determine data, such as packets or TBs, that are to be retransmitted. For example, the base station may receive feedback from one or more UEs indicating sidelink communications associated with an erasure or a failed transmission. In some cases, another device (such as an encoder device), rather than the base station, may transmit a network coded sidelink retransmission that combines data from the sidelink communications associated with an erasure or a failed transmission. However, because the network coded sidelink retransmission is transmitted by another device (for example, rather than by the base station) the base station may not receive feedback associated with the transmission of the network coded sidelink retransmission. For example, the base station may be unaware of whether TBs or packets included in the network coded sidelink retransmission have been successfully decoded by UEs in the sidelink network. As a result, the base station may be unable to accurately or efficiently select resources for sidelink communications or schedule UEs to communicate sidelink communications (for example, because the base station is unaware of whether the UEs have successfully received or decoded TBs or packets included in the network coded sidelink retransmissions).

Various aspects relate generally to feedback for network coded sidelink retransmissions. Some aspects more specifically relate to an encoder device transmitting, to a base station, feedback information associated with the network coded sidelink retransmission that is based at least in part on feedback information received, by the encoder device, from one or more UEs. For example, the encoder device may transmit, to the UEs, the network coded sidelink retransmission. The encoder device may receive, from the UEs, feedback information associated with the network coded sidelink retransmission, that indicates whether the one or more UEs successfully decoded a set of TBs associated with the network coded sidelink retransmission. The encoder device may transmit, to the base station, feedback information associated with the network coded sidelink retransmission that is based at least in part on the feedback information received from the UEs. In other words, the encoder device may collect or aggregate feedback associated with a network coded sidelink retransmission and may transmit the collected or aggregated feedback to the base station (for example, the base station that performs sidelink resource selection or scheduling for the UEs).

In some aspects, the feedback information transmitted by the encoder device to the base station may be full feedback information that provides information for each TB associated with the network coded sidelink retransmission and each receiver (for example, each UE) associated with the network coded sidelink retransmission. For example, the feedback information may include, for each TB, a separate indication for each UE associated with the network coded sidelink retransmission, indicating whether the UE successfully decoded the TB. In some other aspects, the feedback information transmitted by the encoder device to the base station may be partial feedback information that provides information for each TB associated with the network coded sidelink retransmission, but not all receivers associated with the network coded sidelink retransmission. For example, the feedback information transmitted by the encoder device may include a single indication (for example, a single bit) for each TB associated with the network coded sidelink retransmission, where the single indication indicates whether at least one of the UEs successfully decoded the TB. In some other aspects, the feedback information transmitted by the encoder device to the base station may include a single indication (for example, a single bit) that indicates whether all TBs associated with the network coded sidelink retransmission (for example, the entire set of TBs) were successfully decoded. Additionally or alternatively, the UEs associated with the network coded sidelink transmission may transmit, directly to the base station, feedback information associated with the network coded sidelink retransmission.

Particular aspects of the subject matter described in this disclosure can be implemented to realize one or more of the following potential advantages. In some examples, the described techniques can be used to enable a base station to efficiently and accurately manage sidelink communications based on receiving feedback information associated with a network coded sidelink retransmission that is transmitted by another device (such as an encoder device). As a result of receiving the feedback information for the network coded sidelink retransmission, the base station may be enabled to make improved scheduling determinations and resource allocations for sidelink communications. For example, the base station may determine additional network coded sidelink retransmissions (for example, the base station may determine TBs to be included in the additional network coded sidelink retransmissions), determine TBs or packets that need to be retransmitted, or determine resource allocations for future sidelink transmissions or retransmissions, among other examples.

Figure 8:
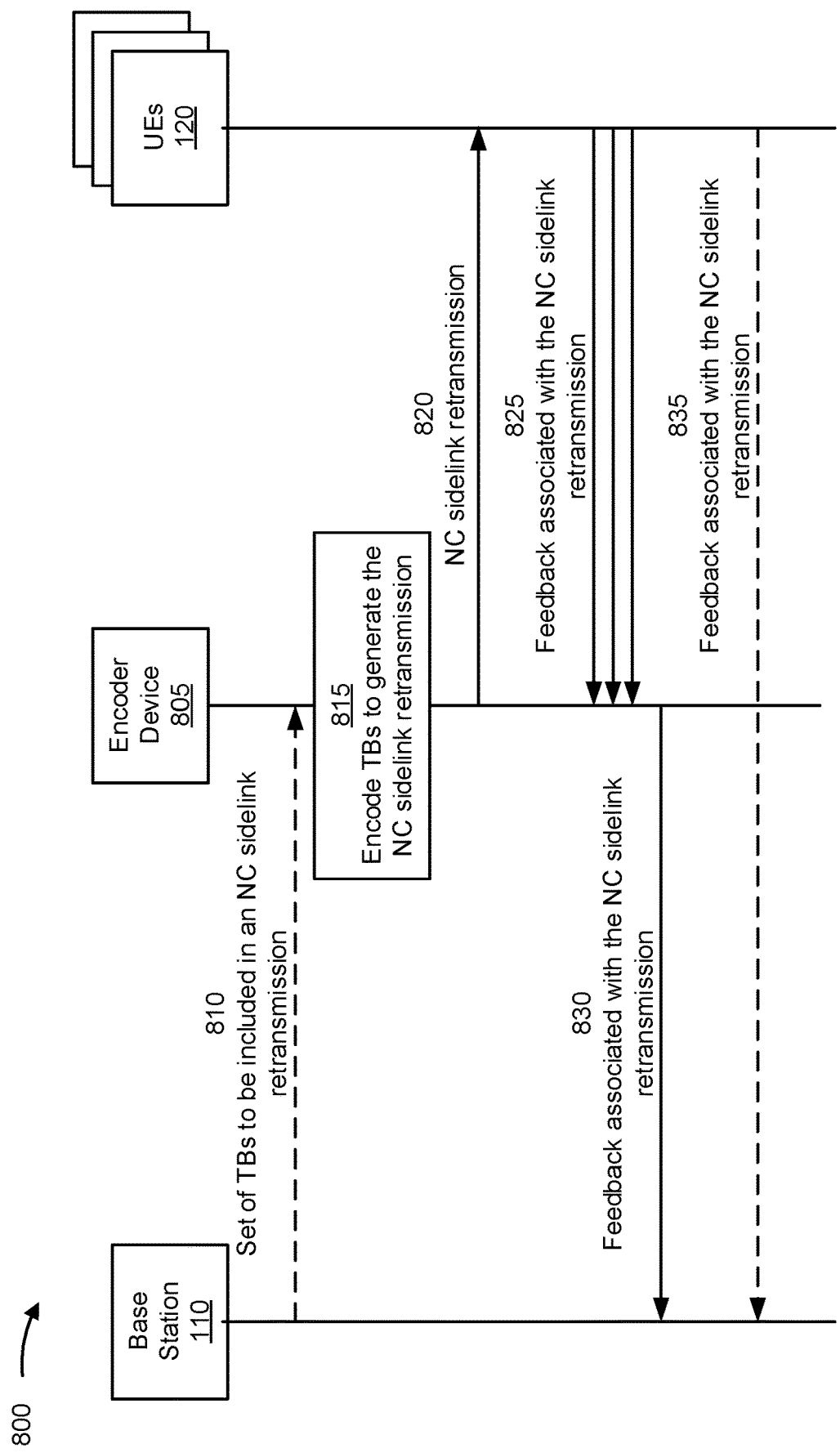
FIG. 8 is a diagram illustrating an example associated with feedback for network coded sidelink retransmissions, in accordance with the present disclosure.

FIG. 8 is a diagram illustrating an example associated with feedback 800 for network coded sidelink retransmissions, in accordance with the present disclosure. As shown in FIG. 8, a base station 110, an encoder device 805, and one or more UEs 120 may communicate with one another in a wireless network, such as the wireless network 100. For example, the encoder device 805 and the one or more UEs 120 may communicate with one another via a sidelink (for example, in a similar manner as described in connection with FIGS. 3 and 4). The one or more UEs 120 may correspond to any of the UEs described above, such as the UE 305, the UE 505, the UE 510, the UE 515, the UE 705, or the UE 715. The encoder device 805 may be a network node for network coding based retransmission of communications transmitted via the sidelink. The encoder device 805 may be a UE, an RSU, a base station, a vehicle, or another device. While FIG. 8 depicts a single encoder device 805, in some aspects, the base station 110 may communicate with multiple encoder devices 805 in a similar manner as described herein. Some examples are described herein in connection with TBs. However, operations described herein are not limited to only TBs and the operations described herein may be applicable to any type of communication, such as packets. In other words, "TBs" or "transport blocks" may be used interchangeably herein with "packets."

In some aspects, the one or more UEs 120 or the encoder device 805 may transmit one or more communications. In some aspects, the communications may be P2P communications, such as sidelink communications. Additionally or alternatively, the communications may include one or more packets or TBs. For example, a first communication from a first UE 120 to a second UE 120 may be a first P2P communication that includes a first packet, and a second communication from the first UE 120 to a third UE 120 may be a second P2P communication that includes a second packet. However, the communications are not limited to P2P communications, and are not limited to including packets, and may be any type of communication. In some aspects, one or more of the communications may be transmitted by another UE.

In some aspects, communications, such as the first communication or the second communication, may become lost or corrupted (for example, as a result of a transmission error, channel conditions, changing locations of UEs, or a similar issue). This loss or corruption of the communication may be referred to as an "erasure" of the communication. For example, the second UE 120 may fail to receive the first communication, but may receive the second communication. In contrast, the third UE 120 may receive the first communication, but may fail to receive the second communication. The second UE 120 may therefore have an erasure associated with the first transmission, while the third UE 120 may have an erasure associated with the second transmission. Thus, the first UE 120 or another node may need to retransmit the communications (for example, the first communication and the second communication) such that they are received by the second UE 120 and the third UE 120.

In some aspects, if the first UE 120 or the encoder device 805 does not use network coding to retransmit the communications, then the first UE 120 or the encoder device 805 may need to retransmit both the first communication and the second communication (for example, for a total of two retransmissions). For example, the first UE 120 or the encoder device 805 may retransmit the first communication because the second UE 120 previously failed to receive the first communication. Furthermore, the first UE 120 or the encoder device 805 may retransmit the second communication because the third UE 120 previously failed to receive the second communication. Network coding, as described in detail below, may reduce the quantity of (re)transmissions needed, and may therefore reduce the quantity of resources required for those (re)transmissions. As described herein, network coding may reduce a quantity of resources required, and therefore reduce a load on the network, by combining multiple transmissions into a single transmission. Referring to the example above, network coding may enable the encoder device 805 to combine and retransmit the first communication and the second communication as a single network coded communication. Therefore, the load on the network is reduced (for example, from requiring two resources to requiring one resource).

The encoder device 805 may store one or more TBs or one or more packets (for example, transmitted via a sidelink channel) in a buffer of the encoder device 805. This may enable the encoder device 805 to have access to the one or more TBs or the one or more packets (for example, to include in a network coded sidelink retransmission, as described in more detail elsewhere herein). In some aspects, a UE 120 that is associated with a failed or erased transmission (for example, a transmitter or receiver of the failed or erased transmissions) may report the failure or erasure to the base station 110. For example, UEs 120 in a sidelink network may transmit, to the base station 110, feedback (for example, ACK or NACK feedback) associated with sidelink communications to enable the base station 110 to schedule retransmissions for failed sidelink communications (for example, in the Mode 1 transmission mode). The base station 110 may identify sidelink data (for example, TBs or packets) that need to be retransmitted. For example, the base station 110 may identify (for example, based at least in part on feedback received from one or more UEs 120) packets or TBs that are to be included in a network coded sidelink retransmission. The packets or the TBs may be associated with one or more sidelink communications. In some aspects, the packets or the TBs may be associated with different sidelink communications or different UEs 120.

In some aspects, in a first operation 810, the base station 110 may transmit, and the encoder device 805 may receive, an indication of a set of TBs (or packets) for a network coded sidelink retransmission. For example, the base station 110 may identify TBs or packets that are available to the encoder device 805 (for example, that are stored in a buffer of the encoder device 805). The indication of the set of TBs or packets may be included in a PDCCH message (for example, the base station 110 may use the PDCCH message to transmit the indication of the set of TBs or packets to the encoder device 805). In some aspects, the indication of the set of TBs or packets may be included in a unicast message associated with the encoder device 805 (for example, the message that includes the indication of the set of TBs or packets may be a one-to-one message between the base station 110 and the encoder device 805). In some other aspects, the indication of the set of TBs or packets may be included in a multicast message associated with multiple encoder devices including the encoder device 805 (for example, the message that includes the indication of the set of TBs or packets may be a one-to-many message between the base station 110 and multiple encoder devices).

The indication of a set of TBs (or packets) for the network coded sidelink retransmission may include identifying information for each TB (or packet) included in the set of TBs (or packets). For example, the indication of a set of TBs for the network coded sidelink retransmission may include, for each TB included in the set of TBs, an indication of at least one of a source identifier or a packet identifier. As described elsewhere herein, the source identifier may be an identifier of a source of the TB (for example, an identifier of an initial transmitter of the TB). The source identifier or the packet identifier may be included in a header of the TB. Including the source identifier or the packet identifier in the indication may enable the encoder device 805 to identify the TB (for example, in a buffer of the encoder device 805).

Additionally or alternatively, in the first operation 810, the base station 110 may transmit, and the encoder device 805 may receive, a resource allocation for the network coded sidelink retransmission. For example, the base station 110 may allocate or reserve time-frequency resources or other resources (such as spatial domain resources) for the network coded sidelink retransmission. In some aspects, the base station 110 may only transmit the indication of the resource allocation for the network coded sidelink retransmission in the first operation 810. In other words, the base station 110 may not determine or indicate the set of TBs to be associated with (for example, to be encoded for) the network coded sidelink retransmission. In such examples, the encoder device 805 may determine the set of TBs to be associated with (for example, to be encoded for) the network coded sidelink retransmission (for example, based at least in part on feedback associated with one or more sidelink communications).

In a second operation 815, the encoder device 805 may encode TBs (for example, TBs indicated by the base station 110 in the first operation 810) to generate the network coded (NC) sidelink retransmission. For example, the encoder device 805 may encode TBs, included in the set of TBs, that are stored in a buffer of the encoder device 805 to generate the network coded sidelink retransmission. In some aspects, all of the TBs from the set of TBs may be encoded to generate the network coded sidelink retransmission. In some other aspects, less than all of the TBs, from the set of TBs, may be encoded to generate the network coded sidelink retransmission (for example, when the encoder device 805 does not have all of the TBs, from the set of TBs, stored in the buffer of the encoder device 805). The encoder device 805 may encode the TBs in a similar manner as described in more detail elsewhere herein, such as in connection with FIG. 6.

In a third operation 820, the encoder device 805 may transmit the network coded sidelink retransmission. For example, the encoder device 805 may transmit the network coded sidelink retransmission based at least in part on encoding TBs, included in the set of TBs, that are stored in a buffer of the encoder device to generate the network coded sidelink retransmission, as described above. The encoder device 805 may transmit the network coded sidelink retransmission to the one or more UEs 120. The encoder device 805 may transmit the network coded sidelink retransmission using a sidelink channel, such as the PSSCH. The network coded sidelink retransmission may include a set of encoded TBs. The set of encoded TBs may be based at least in part on the set of TBs (for example, that are indicated by the base station 110 in the first operation 810).

The one or more UEs 120 may receive the network coded sidelink retransmission and may attempt to decode the network coded sidelink retransmission. For example, a UE 120, of the one or more UEs 120, may decode the network coded sidelink retransmission to attempt to recover a TB or a packet (for example, that was intended for the UE 120) from a previous sidelink communication that failed. Another UE 120, of the one or more UEs 120, may decode the network coded sidelink retransmission to attempt to recover a different TB or a different packet (for example, that was intended for the other UE 120) from a different previous sidelink communication that failed. In this way, the network coded sidelink retransmission may reduce a quantity of retransmissions needed for the one or more UEs 120 to recover TBs or packets from different sidelink communications (for example, because only a single retransmission is needed for the one or more UEs 120 to recover TBs or packets from different sidelink communications).

In a fourth operation 825, the one or more UEs 120 may transmit feedback associated with the network coded sidelink retransmission. The feedback may indicate whether TBs, from the set of TBs associated with the network coded sidelink retransmission, were successfully decoded or recovered by the one or more UEs. For example, if a UE 120, of the one or more UEs 120, successfully decodes or recovers a TB, from the set of TBs, based at least in part on receiving or decoding the network coded sidelink retransmission, then the UE 120 may transmit ACK feedback for the TB. Alternatively, if the UE 120 fails to decode or recover the TB based at least in part on receiving or decoding the network coded sidelink retransmission, then the UE 120 may transmit NACK feedback for the TB.

For example, the encoder device 805 may receive, from the one or more UEs 120, first feedback information, associated with the network coded sidelink retransmission, that indicates whether the one or more UEs 120 successfully decoded the set of TBs. In some aspects, the first feedback information may include ACK or NACK feedback for given TBs included in the set of TBs. For example, a UE 120 may transmit ACK or NACK feedback for each TB that is associated with the UE 120 (for example, for each TB for which the UE 120 is an intended recipient). The encoder device 805 may collect or aggregate the feedback, associated with the network coded sidelink retransmission, that is received from the one or more UEs 120. For example, for a given TB, the encoder device 805 may collect ACK or NACK feedback associated with the TB from one UE or from multiple UEs (for example, the encoder device 805 may collect ACK or NACK feedback associated with the TB from all intended recipients of the TB). The encoder device 805 may similarly collect or aggregate feedback for all TBs associated with (for example, encoded for) the network coded sidelink retransmission.

In a fifth operation 830, the encoder device 805 may transmit, and the base station 110 may receive, second feedback information associated with the network coded sidelink retransmission that is based at least in part on the first feedback information (for example, that is received by the encoder device 805 in the fourth operation 825). In some aspects, the second feedback information may be full feedback information (for example, feedback information that indicates ACK or NACK feedback for each TB and each receiver (each UE) associated with the network coded sidelink retransmission), the second feedback information may include one indication (for example, one ACK or NACK indication) for each TB associated with the network coded sidelink retransmission, or the second feedback information may include one indication (for example, one ACK or NACK indication) for the entire network coded sidelink retransmission.

For example, in cases where the second feedback information is full feedback information, the second feedback information, for each TB of the set of TBs, may include a separate indication for each UE 120, included in the one or more UEs 120, indicating whether the UE 120 successfully decoded the TB. In other words, for a given TB, the second feedback information may include a separate indication (for example, a separate ACK or NACK indication) for each UE 120 that is an intended recipient of the given TB. The second feedback information may similarly include separate indications for each TB associated with the network coded sidelink retransmission. In such examples, the second feedback information may be included in a PUSCH message. For example, the full feedback information may be associated with a larger size (for example, due to including separate indications for multiple UEs and multiple TBs). The PUSCH may be associated with a larger capacity (for example, as compared to the PUCCH). Therefore, the full feedback information may be transmitted via the PUSCH.

For example, for a given TB that is associated with the network coded sidelink retransmission, the encoder device 805 may collect ACK or NACK feedback, for the given TB, from one or more UEs 120 (for example, UEs 120 that are an intended recipient of the given TB). For the given TB, the encoder device 805 may transmit, to the base station 110, a feedback packet (for example, in the fifth operation 830). The feedback packet may include, for a UE 120 of the one or more UEs 120 (for example, UEs 120 that are an intended recipient of the given TB), an indication of an indication of the ACK/NACK feedback transmitted by the UE 120, an identifier of an original transmitter (for example, an identifier of the UE 120 that originally transmitted the given TB) associated with the given TB, an identifier of the TB, or an identifier of the UE 120 that is associated with the ACK/NACK feedback, among other examples. The encoder device 805 may include similar indications in the feedback packet for each UE 120 of the one or more UEs 120 associated with the given TB. The encoder device 805 (for example, in the fifth operation 830) may transmit feedback packets for all TB s associated with the network coded sidelink retransmission in a similar manner.

In some aspects, a feedback packet may include an indication of whether the base station 110 is to provide feedback associated with the feedback packet (for example, associated with the second feedback information transmitted by the encoder device 805 in the fifth operation 830). For example, a feedback packet may include an indication of whether the feedback packet should be acknowledged by the base station 110. In some aspects, the second feedback information may be configured to include up to a quantity of ACK/NACK feedback indications associated with the network coded sidelink retransmission. For example, a maximum quantity of ACK/NACK feedback indications (or feedback packets) associated with the network coded sidelink retransmission that can be transmitted by the encoder device 805 may be defined (for example, by a wireless communication standard) or configured (for example, by the base station 110). For example, the base station 110 may transmit, and the encoder device 805 may receive, an indication of the quantity (for example, the maximum quantity) of ACK/NACK feedback indications. The quantity (for example, the maximum quantity) of ACK/NACK feedback indications may ensure that a size of the second feedback information transmitted by the encoder device 805 does not exceed a threshold size.

In some aspects, the second feedback information (for example, transmitted by the encoder device 805 in the fifth operation 830) may be included in, or combined with, other signaling transmitted by the encoder device 805. For example, the encoder device 805 may transmit, and the base station 110 may receive, an uplink communication that is not associated with the network coded sidelink retransmission. The uplink communication and the second feedback information may be included in the same message. For example, the uplink communication may be a request for resources for future communications (for example, for future sidelink communications or future uplink communications).

In some aspects, the transmission of the second feedback information (for example, in the fifth operation 830) may be triggered based at least in part on receiving the first feedback information (for example, in the fourth operation 825). In other words, the encoder device 805 may be triggered to transmit a feedback packet (for example, in the fifth operation 830) based at least in part on receiving feedback information (for example, ACK/NACK feedback) from a UE 120 for a given TB (for example, in the fourth operation 825). Additionally or alternatively, transmitting the second feedback information (for example, in the fifth operation 830) may be based at least in part on an amount of time after transmitting the network coded sidelink retransmission (for example, in the third operation 820) satisfying a threshold. In other words, the encoder device 805 may transmit the second feedback information (for example, in the fifth operation 830) an amount of time after transmitting the network coded sidelink retransmission (for example, in the third operation 820). The amount of time may be pre-configured or defined (for example, by a wireless communication standard) or configured by the base station 110. Additionally or alternatively, transmitting the second feedback information (for example, in the fifth operation 830) may be based at least in part on a periodic schedule. For example, the encoder device 805 may periodically transmit the second feedback information associated with the network coded sidelink retransmission. The periodic schedule (for example, an amount of time between transmissions of the second feedback information associated with the network coded sidelink retransmission) may be pre-configured or defined (for example, by a wireless communication standard) or configured by the base station 110. The full feedback information may enable the base station 110 to make improved scheduling or resource allocation determinations for the sidelink network. For example, the full feedback information may enable the base station 110 to identify which UEs 120 have successfully decoded a given TB and which UEs have not successfully decoded the given TB. This may enable the base station 110 to make improved scheduling or resource allocation determinations for future sidelink transmissions or future network coded sidelink retransmissions (for example, when the base station 110 determines a combination of TBs to be included in network coded sidelink retransmissions).

In some other aspects, the second feedback information may include one indication (for example, one ACK or NACK indication or a single bit) for each TB associated with the network coded sidelink retransmission (for example, rather than including multiple indications for a single TB as described above in connection with the full feedback information). For example, a single bit may be used to indicate ACK or NACK feedback for a given TB associated with the network coded sidelink retransmission. In examples where the encoder device 805 includes a single indication (for example, a single bit) for each TB, the second feedback information may be transmitted (for example, in the fifth operation 830) via the PUCCH. For example, the second feedback information may be included in a PUCCH message. The second feedback information (for example, transmitted by the encoder device 805 in the fifth operation 830) may include a separate indication for each TB, of the set of TBs associated with the network coded sidelink retransmission. Each indication may be based at least in part on feedback received from the one or more UEs 120 (for example, in the fourth operation 825).

For example, for a given TB that is associated with the network coded sidelink retransmission, the encoder device 805 may collect ACK or NACK feedback, for the given TB, from one or more UEs 120 (for example, UEs 120 that are an intended recipient of the given TB). The encoder device 805 may determine whether to indicate ACK feedback or NACK feedback, for the given TB, based at least in part on the collected feedback from the one or more UEs 120 (for example, UEs 120 that are an intended recipient of the given TB). For example, the encoder device 805 may indicate ACK feedback for the given TB based at least in part on the first feedback information (for example, received by the encoder device 805 in the fourth operation 825) indicating ACK indications, associated with the given TB, from all of the one or more UEs 120 (for example, UEs 120 that are an intended recipient of the given TB). In other words, the encoder device 805 may indicate ACK feedback (for example, the second feedback indication may be associated with ACK feedback) for a given TB based at least in part on all the feedback received by the encoder device 805 for the given TB (from different recipients) being ACK feedback. In such examples, if the encoder device 805 receives NACK feedback associated with the given TB from any UE 120 (for example, in the fourth operation 825), then the encoder device 805 may transmit (for example, in the fifth operation 830) NACK feedback associated with given TB.

As another example, the encoder device 805 may indicate ACK feedback for the given TB based at least in part on a quantity of ACK indications, included in the first feedback information (for example, received by the encoder device 805 in the fourth operation 825) and associated with the TB, satisfying a threshold. In other words, the encoder device 805 may indicate ACK feedback for a given TB based at least in part on the quantity of ACK feedback indications received by the encoder device 805 for the given TB satisfying a first threshold. For example, if the quantity of ACK feedback indications received by the encoder device 805 for the given TB satisfies the first threshold, then the encoder device 805 may transmit (for example, in the fifth operation 830) ACK feedback for the given TB. If the quantity of ACK feedback indications received by the encoder device 805 for the given TB does not satisfy the first threshold, then the encoder device 805 may transmit (for example, in the fifth operation 830) NACK feedback for the given TB.

As another example, the encoder device 805 may indicate ACK feedback for the given TB based at least in part on a ratio of ACK indications, included in the first feedback information (for example, received by the encoder device 805 in the fourth operation 825) and associated with the TB, to NACK indications, included in the first feedback information (for example, received by the encoder device 805 in the fourth operation 825) and associated with the TB, satisfying a threshold. In other words, the encoder device 805 may determine a ratio of a quantity of ACK feedbacks to a quantity of NACK feedback indications for the given TB. If the ratio satisfies a second threshold, then the encoder device 805 may transmit (for example, in the fifth operation 830) ACK feedback for the given TB. If the ratio does not satisfy the second threshold, then the encoder device 805 may transmit (for example, in the fifth operation 830) NACK feedback for the given TB.

The encoder device 805 may transmit the second feedback information including a single indication for each TB associated with the network coded sidelink retransmission based at least in part on mapping rules between coded TBs and HARQ-ACK feedback being defined or indicated (for example, by the base station 110). For example, when the base station 110 determines the combination of TBs to be included in the network coded sidelink retransmission, the base station 110 may indicate the mapping rules between coded TBs and HARQ-ACK feedback. Therefore, the encoder device 805 may be enabled to map a single bit (for example, a single indication) of HARQ-ACK feedback included in the second feedback information to a TB. As described above, encoder device 805 may transmit the second feedback information including a single indication for each TB associated with the network coded sidelink retransmission via the PUCCH. For example, a capacity of the PUCCH may be sufficient to support a size of the second feedback information when a single indication (for example, a single bit) for each TB associated with the network coded sidelink retransmission is included in the second feedback information.

In a similar manner as described above, the transmission of the second feedback information (for example, in the fifth operation 830) that includes a single indication (for example, a single bit) for each TB associated with the network coded sidelink retransmission may be triggered based at least in part on receiving the first feedback information (for example, in the fourth operation 825). Additionally or alternatively, transmitting the second feedback information (for example, in the fifth operation 830) may be based at least in part on an amount of time after transmitting the network coded sidelink retransmission (for example, in the third operation 820) satisfying a threshold. Additionally or alternatively, transmitting the second feedback information (for example, in the fifth operation 830) may be based at least in part on a periodic schedule.

In some other aspects, the second feedback information (for example, transmitted by the encoder device 805 in the fifth operation 830) may include a single indication (for example, a single bit) associated with the entire network coded sidelink retransmission (for example, associated with all TBs that are associated with the network coded sidelink retransmission). For example, the second feedback information may include a single ACK or NACK feedback indication associated with the network coded sidelink retransmission and the set of TBs. For example, for a given TB that is associated with the network coded sidelink retransmission, the encoder device 805 may collect ACK or NACK feedback, for the given TB, from one or more UEs 120 (for example, UEs 120 that are an intended recipient of the given TB). The encoder device 805 may collect ACK or NACK feedback for all TBs associated with the network coded sidelink retransmission in a similar manner. The encoder device 805 may determine whether the single indication (for example, the single ACK or NACK feedback) is to indicate ACK feedback or NACK feedback based at least in part on the collected feedback for all of the TBs (for example, received by the encoder device in the fourth operation 825). For example, the single indication (for example, the single ACK or NACK feedback) may indicate ACK feedback based at least in part on the first feedback information (for example, received by the encoder device 805 in the fourth operation 825) indicating that each TB, of the set of TBs that is associated with the network coded sidelink retransmission, was successfully decoded by all of intended recipients from the one or more UEs 120. In other words, the encoder device 805 may transmit (for example, in the fifth operation 830) ACK feedback for the network coded sidelink retransmission based at least in part on all TBs being decoded successfully for all recipients (for example, from the one or more UEs 120). For example, the encoder device 805 may determine, for a given TB, whether all intended recipients for the given TB have successfully decoded the given TB. If all intended recipients for the given TB have successfully decoded the given TB, then the encoder device 805 may determine that the given TB has been successfully decoded. If one or more of the intended recipients for the given TB have not successfully decoded the given TB, then the encoder device 805 may determine that the given TB has not been successfully decoded. If the encoder device 805 determines that all TBs associated with the network coded sidelink retransmission have been successfully decoded, then the encoder device 805 may transmit (for example, in the fifth operation 830) ACK feedback for the network coded sidelink retransmission. If the encoder device 805 determines that one or more TBs associated with the network coded sidelink retransmission have not been successfully decoded, then the encoder device 805 may transmit (for example, in the fifth operation 830) NACK feedback for the network coded sidelink retransmission.

As another example, the single indication (for example, the single ACK or NACK feedback) may indicate ACK feedback based at least in part on a quantity of TBs, as indicated by the first feedback information (for example, in the fourth operation 825), that were successfully decoded satisfying a threshold. A TB may be "successfully" decoded based at least in part on all intended recipients associated with the TB transmitting ACK feedback associated with the TB (for example, in the fourth operation 825) or based at least in part on a quantity of intended recipients associated with the TB that transmit ACK feedback associated with the TB (for example, in the fourth operation 825) satisfying a threshold. For example, the encoder device 805 may determine, based at least in part on the first feedback information provided by the one or more UEs in the fourth operation 825, a quantity of TBs, associated with the network coded sidelink retransmission, that have been successfully decoded. If the quantity of TBs that have been successfully decoded satisfies a threshold, then the encoder device 805 may transmit ACK feedback for the network coded sidelink retransmission (for example, in the fifth operation 830). If the quantity of TBs that have been successfully decoded does not satisfy the threshold, then the encoder device 805 may transmit NACK feedback for the network coded sidelink retransmission (for example, in the fifth operation 830). In some aspects, the encoder device 805 may transmit ACK feedback for the network coded sidelink retransmission based at least in part on a quantity of TBs, associated with the network coded sidelink retransmission, that have not been successfully decoded (for example, that have failed) not satisfying a threshold (for example, the same threshold as described above or a different threshold).

As another example, the single indication (for example, the single ACK or NACK feedback) may indicate ACK feedback based at least in part on a quantity of failed decodings, indicated by the first feedback information (for example, received by the encoder device 805 in the fourth operation 825) for the one or more UEs 120, satisfying a threshold. A "failed decoding" may refer to an instance of a single UE 120 failing to decode a given TB (for example, a failed decoding may occur when a UE 120 transmits NACK feedback associated with the given TB). The encoder device 805 may determine the quantity of failed decoding based at least in part on the first feedback information transmitted by the one or more UEs (for example, in the fourth operation 825). If the quantity of failed decodings is less than or equal to a threshold, then the encoder device 805 may transmit ACK feedback for the network coded sidelink retransmission (for example, in the fifth operation 830). If the quantity of failed decodings is greater than the threshold, then the encoder device 805 may transmit NACK feedback for the network coded sidelink retransmission (for example, in the fifth operation 830).

As another example, the single indication (for example, the single ACK or NACK feedback) may indicate ACK feedback based at least in part on a quantity of transmissions or retransmissions associated with the one or more TBs, included in the set of TBs, satisfying a threshold. For example, a given TB may be associated with a permitted quantity (for example, a maximum quantity) of transmissions or retransmissions. The encoder device 805 may determine a quantity of transmissions or retransmissions associated with each TB. For each TB, the encoder device 805 may determine whether a quantity of transmissions or retransmissions associated with the TB satisfies a threshold (for example, the threshold may be the permitted quantity or the maximum quantity). If one or more (or a threshold quantity of) TBs associated with the network coded sidelink retransmission are associated with a quantity of transmissions or retransmissions that do not satisfy the threshold (for example, are greater than the threshold), then the encoder device 805 may transmit ACK feedback for the network coded sidelink retransmission (for example, in the fifth operation 830). For example, because the one or more TBs may have been transmitted or retransmitted a maximum quantity of times, the encoder device 805 may indicate ACK feedback so that the base station 110 does not attempt to schedule another retransmission of the one or more TBs.

The encoder device 805 may transmit NACK feedback to indicate to the base station 110 that additional resources for another network coded sidelink transmission are needed. For example, the second feedback information (for example, transmitted by the encoder device 805 in the fifth operation 830) may indicate NACK feedback. The base station 110 may transmit, and the encoder device 805 may receive, an indication of sidelink resources to be used to retransmit the network coded sidelink retransmission based at least in part on the single feedback indication being associated with NACK feedback.

Additionally or alternatively, in a sixth operation 835, the one or more UEs 120 may transmit feedback, associated with the network coded sidelink retransmission, to the base station 110. For example, the one or more UEs 120 may transmit similar (or the same) feedback information, as described in connection with the fourth operation 825, directly to the base station 110. In some aspects, the one or more UEs 120 may perform the fourth operation 825 or the sixth operation 835, but not both. In examples where the one or more UEs 120 do not perform the fourth operation 825, the encoder device 805 may not perform the fifth operation 830. Alternatively, the one or more UEs 120 may perform both the fourth operation 825 and the sixth operation 835.

In some aspects, the base station 110 may transmit, and the encoder device 805 may receive, an indication of a UE 120 (or multiple UEs 120), from the one or more UEs 120, that is to transmit feedback, associated with the network coded sidelink retransmission, directly to the base station 110. The encoder device 805 may transmit, and the UE 120 (or the multiple UEs 120) may receive, an indication that the UE 120 is to transmit the feedback, associated with the network coded sidelink retransmission, directly to the base station 110. In some aspects, the indication that the UE 120 is to transmit the feedback, associated with the network coded sidelink retransmission, directly to the base station 110 may include, or indicate, an allocation of uplink resources (for example, PUCCH resources) to be used by the UE 120 to transmit the feedback information to the base station 110 (for example, in the sixth operation 835). The indication that the UE 120 is to transmit the feedback, associated with the network coded sidelink retransmission, directly to the base station 110 may be included in the same message as another communication transmitted to the UE 120. In some aspects, the indication that the UE 120 is to transmit the feedback, associated with the network coded sidelink retransmission, directly to the base station 110 may be included in the network coded sidelink transmission. For example, the indication that the UE 120 is to transmit the feedback, associated with the network coded sidelink retransmission, directly to the base station 110 may be included in a header of the network coded sidelink retransmission.

In some aspects, the feedback information transmitted by a UE 120 in the sixth operation 635 may include information associated with a given TB. For example, for a TB associated with the network coded sidelink retransmission, the feedback information transmitted by a UE 120 in the sixth operation 635 may include an indication of ACK or NACK feedback associated with the TB, an identifier associated with an original transmitter of the TB, or an identifier associated with the TB, among other examples. The UE 120 may transmit similar information for other TBs associated with the network coded sidelink retransmission. For example, the UE 120 may transmit feedback information for each TB, associated with the network coded sidelink retransmission, for which the UE 120 is an intended recipient.

The base station 110 may identify the UE 120 that transmits the feedback information based at least in part on the uplink resource (for example, the PUCCH resource) used by the UE 120 to transmit the feedback information. For example, different UEs 120 may be allocated different uplink resources (for example, different PUCCH resources) to transmit feedback information. Therefore, the base station 110 may be enabled to identify the UE 120 associated with a given feedback transmission based at least in part on the uplink resource (for example, the PUCCH resource) used by the UE 120 to transmit the feedback information.

As a result, the base station 110 may be enabled to efficiently and accurately manage sidelink communications. For example, the base station 110 may receive feedback information associated with a network coded sidelink retransmission that is transmitted by another device (for example, the encoder device 805). This may enable the base station 110 to determine additional network coded sidelink retransmissions, determine TBs or packets that need to be retransmitted, or determine resource allocations for future sidelink transmissions or retransmissions, among other examples. As a result of receiving the feedback information for the network coded sidelink retransmission, the base station 110 may be enabled to make improved scheduling determinations and resource allocations for sidelink communications.

FIG. 9 is a flowchart illustrating an example process 900 performed, for example, by an encoder device in accordance with the present disclosure. Example process 900 is an example where the encoder device (for example, the encoder device 805, the RSU 160, the UE 120, or the base station 110) performs operations associated with feedback for network coded sidelink retransmissions.

As shown in FIG. 9, in some aspects, process 900 may include transmitting a network coded sidelink retransmission that is associated with a set of TBs, the set of TBs associated with one or more sidelink transmissions (block 910). For example, the encoder device (such as by using communication manager 170 or transmission component 1204, depicted in FIG. 12) may transmit a network coded sidelink retransmission that is associated with a set of TBs, the set of TBs associated with one or more sidelink transmissions, as described above.

As further shown in FIG. 9, in some aspects, process 900 may include receiving, from one or more UEs, first feedback information, associated with the network coded sidelink retransmission, that indicates whether the one or more UEs successfully decoded the set of TBs (block 920). For example, the encoder device (such as by using communication manager 170 or reception component 1202, depicted in FIG. 12) may receive, from one or more UEs, first feedback information, associated with the network coded sidelink retransmission, that indicates whether the one or more UEs successfully decoded the set of TBs, as described above.

As further shown in FIG. 9, in some aspects, process 900 may include transmitting, to a base station, second feedback information associated with the network coded sidelink retransmission that is based at least in part on the first feedback information (block 930). For example, the encoder device (such as by using communication manager 170 or transmission component 1204, depicted in FIG. 12) may transmit, to a base station, second feedback information associated with the network coded sidelink retransmission that is based at least in part on the first feedback information, as described above.

Process 900 may include additional aspects, such as any single aspect or any combination of aspects described below or in connection with one or more other processes described elsewhere herein.

In a first additional aspect, the second feedback information, for each TB of the set of TBs, includes a separate indication for each UE, included in the one or more UEs, indicating whether the UE successfully decoded the TB.

In a second additional aspect, alone or in combination with the first aspect, the second feedback information is included in a PUSCH message.

In a third additional aspect, alone or in combination with one or more of the first and second aspects, the first feedback information includes ACK/NACK feedback, associated with a UE, of the one or more UEs, and associated with an TB of the set of TBs, and the second feedback information includes at least one of an indication of the ACK/NACK feedback, an identifier of an original transmitter associated with the TB, an identifier of the TB, or an identifier of the UE.

In a fourth additional aspect, alone or in combination with one or more of the first through third aspects, the second feedback information includes an indication of whether the base station is to provide feedback associated with the second feedback information.

In a fifth additional aspect, alone or in combination with one or more of the first through fourth aspects, the second feedback information can include up to a quantity of ACK/NACK feedback indications associated with the network coded sidelink retransmission.

In a sixth additional aspect, alone or in combination with one or more of the first through fifth aspects, process 900 includes receiving an indication of the quantity of ACK/NACK feedback indications.

In a seventh additional aspect, alone or in combination with one or more of the first through sixth aspects, process 900 includes transmitting, to the base station, an uplink communication that is not associated with the network coded sidelink retransmission, and the uplink communication and the second feedback information are included in a same message.

In an eighth additional aspect, alone or in combination with one or more of the first through seventh aspects, the transmission of the second feedback information is triggered based at least in part on receiving the first feedback information.

In a ninth additional aspect, alone or in combination with one or more of the first through eighth aspects, transmitting the second feedback information is based at least in part on an amount of time after transmitting the network coded sidelink retransmission satisfying a threshold.

In a tenth additional aspect, alone or in combination with one or more of the first through ninth aspects, transmitting the second feedback information is based at least in part on a periodic schedule.

In an eleventh additional aspect, alone or in combination with one or more of the first through tenth aspects, the second feedback information includes a separate indication for each TB, of the set of TBs, and the separate indication is associated with each UE of the one or more UEs.

In a twelfth additional aspect, alone or in combination with one or more of the first through eleventh aspects, the second feedback information is included in a PUCCH message.

In a thirteenth additional aspect, alone or in combination with one or more of the first through twelfth aspects, the second feedback information includes an ACK indication for an TB, of the set of TBs, based at least in part on the first feedback information indicating ACK indications, associated with the TB, from all of the one or more UEs.

In a fourteenth additional aspect, alone or in combination with one or more of the first through thirteenth aspects, the second feedback information includes an ACK indication for an TB, of the set of TBs, based at least in part on a quantity of ACK indications, included in the first feedback information and associated with the TB, satisfying a threshold.

In a fifteenth additional aspect, alone or in combination with one or more of the first through fourteenth aspects, the second feedback information includes an ACK indication for an TB, of the set of TBs, based at least in part on a ratio of ACK indications, included in the first feedback information and associated with the TB, to NACK indications, included in the first feedback information and associated with the TB, satisfying a threshold.

In a sixteenth additional aspect, alone or in combination with one or more of the first through fifteenth aspects, the second feedback information includes a single ACK/NACK feedback indication associated with the network coded sidelink retransmission and the set of TBs.

In a seventeenth additional aspect, alone or in combination with one or more of the first through sixteenth aspects, the single ACK/NACK feedback indication is associated with ACK feedback based at least in part on the first feedback information indicating that each TB, of the set of TBs, was successfully decoded by all of the one or more UEs.

In an eighteenth additional aspect, alone or in combination with one or more of the first through seventeenth aspects, the single ACK/NACK feedback indication is associated with ACK feedback based at least in part on a quantity of TBs, indicated by the first feedback information, that were successfully decoded satisfying a threshold.

In a nineteenth additional aspect, alone or in combination with one or more of the first through eighteenth aspects, the single ACK/NACK feedback indication is associated with ACK feedback based at least in part on a quantity of failed decodings, indicated by the first feedback information for the one or more UEs, satisfying a threshold.

In a twentieth additional aspect, alone or in combination with one or more of the first through nineteenth aspects, the single ACK/NACK feedback indication is associated with ACK feedback based at least in part on a quantity of retransmissions associated with the one or more TBs, included in the set of TBs, satisfying a threshold.

In a twenty-first additional aspect, alone or in combination with one or more of the first through twentieth aspects, the single ACK/NACK feedback indication is associated with NACK feedback, the method further comprising receiving, from the base station, an indication of sidelink resources to be used to retransmit the network coded sidelink retransmission based at least in part on the single ACK/NACK feedback indication being associated with NACK feedback.

In a twenty-second additional aspect, alone or in combination with one or more of the first through twenty-first aspects, process 900 includes receiving, from the base station, an indication of a UE, from the one or more UEs, that is to transmit feedback, associated with the network coded sidelink retransmission, directly to the base station, and transmitting, to the UE, an indication that the UE is to transmit the feedback, associated with the network coded sidelink retransmission, directly to the base station.

In a twenty-third additional aspect, alone or in combination with one or more of the first through twenty-second aspects, the indication that the UE is to transmit the feedback directly to the base station is included in a header of the network coded sidelink retransmission.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

FIG. 10 is a flowchart illustrating an example process 1000 performed, for example, by a base station in accordance with the present disclosure. Example process 1000 is an example where the base station (for example, base station 110) performs operations associated with feedback for network coded sidelink retransmissions.

As shown in FIG. 10, in some aspects, process 1000 may include transmitting, to an encoder device, an indication of a set of TBs to be encoded for a network coded sidelink retransmission (block 1010). For example, the base station (such as by using communication manager 150 or transmission component 1304, depicted in FIG. 13) may transmit, to an encoder device, an indication of a set of TBs to be encoded for a network coded sidelink retransmission, as described above.

As further shown in FIG. 10, in some aspects, process 1000 may include receiving, from the encoder device or a UE, feedback information associated with the network coded sidelink retransmission that indicates whether the one or more UEs, included the UE, successfully decoded the set of TBs (block 1020). For example, the base station (such as by using communication manager 150 or reception component 1302, depicted in FIG. 13) may receive, from the encoder device or a UE, feedback information associated with the network coded sidelink retransmission that indicates whether the one or more UEs, included the UE, successfully decoded the set of TBs, as described above.

Process 1000 may include additional aspects, such as any single aspect or any combination of aspects described below or in connection with one or more other processes described elsewhere herein.

In a first additional aspect, the feedback information, for each TB of the set of TBs, includes a separate indication for each UE, included in the one or more UEs, indicating whether the UE successfully decoded the TB.

In a second additional aspect, alone or in combination with the first aspect, the feedback information is included in a PUSCH message.

In a third additional aspect, alone or in combination with one or more of the first and second aspects, the feedback information includes at least one of an indication of ACK/NACK feedback for a TB of the set of TBs, an identifier of an original transmitter associated with the TB, an identifier of the TB, or an identifier of a UE associated with the ACK/NACK feedback.

In a fourth additional aspect, alone or in combination with one or more of the first through third aspects, the feedback information includes an indication of whether the base station is to provide feedback associated with the feedback information.

In a fifth additional aspect, alone or in combination with one or more of the first through fourth aspects, the feedback information can include up to quantity of ACK/NACK feedback indications associated with the network coded sidelink retransmission.

In a sixth additional aspect, alone or in combination with one or more of the first through fifth aspects, process 1000 includes transmitting, to the encoder device, an indication of the quantity of ACK/NACK feedback indications.

In a seventh additional aspect, alone or in combination with one or more of the first through sixth aspects, process 1000 includes receiving, from the encoder device, an uplink communication that is not associated with the network coded sidelink retransmission, and the uplink communication and the feedback information are included in a same message.

In an eighth additional aspect, alone or in combination with one or more of the first through seventh aspects, the feedback information includes a separate indication for each TB, of the set of TBs, and the separate indication is associated with each UE of the one or more UEs.

In a ninth additional aspect, alone or in combination with one or more of the first through eighth aspects, the feedback information is included in a PUCCH message.

In a tenth additional aspect, alone or in combination with one or more of the first through ninth aspects, the feedback information includes a single ACK/NACK feedback indication associated with the network coded sidelink retransmission and the set of TBs.

In an eleventh additional aspect, alone or in combination with one or more of the first through tenth aspects, the single ACK/NACK feedback indication is associated with ACK feedback based at least in part on each TB, of the set of TBs, being successfully decoded by all of the one or more UEs.

In a twelfth additional aspect, alone or in combination with one or more of the first through eleventh aspects, the single ACK/NACK feedback indication is associated with ACK feedback based at least in part on a quantity of TBs that were successfully decoded satisfying a threshold.

In a thirteenth additional aspect, alone or in combination with one or more of the first through twelfth aspects, the single ACK/NACK feedback indication is associated with ACK feedback based at least in part on a quantity of failed decodings of the set of TBs by the one or more UEs satisfying a threshold.

In a fourteenth additional aspect, alone or in combination with one or more of the first through thirteenth aspects, the single ACK/NACK feedback indication is associated with ACK feedback based at least in part on a quantity of retransmissions associated with one or more TBs, included in the set of TBs, satisfying a threshold.

In a fifteenth additional aspect, alone or in combination with one or more of the first through fourteenth aspects, the single ACK/NACK feedback indication is associated with NACK feedback, the method further comprising transmitting, to the encoder device, an indication of sidelink resources to be used to retransmit the network coded sidelink retransmission based at least in part on the single ACK/NACK feedback indication being associated with NACK feedback.

In a sixteenth additional aspect, alone or in combination with one or more of the first through fifteenth aspects, process 1000 includes transmitting, to the encoder device, an indication that the UE is to transmit feedback, associated with the network coded sidelink retransmission, directly to the base station.

In a seventeenth additional aspect, alone or in combination with one or more of the first through sixteenth aspects, receiving the feedback information includes receiving, from the UE, an indication of at least one of ACK or ACK/NACK feedback associated with a TB included in the set of TBs, an identifier associated with an original transmitter of the TB, or an identifier associated with the TB.

In an eighteenth additional aspect, alone or in combination with one or more of the first through seventeenth aspects, the feedback information is included in a PUCCH message.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

FIG. 11 is a flowchart illustrating an example process 1100 performed, for example, by a UE in accordance with the present disclosure. Example process 1100 is an example where the UE (for example, UE 120) performs operations associated with feedback for network coded sidelink retransmissions.

As shown in FIG. 11, in some aspects, process 1100 may include receiving, from an encoder device, a network coded sidelink retransmission that includes a set of TBs, the set of TBs associated with one or more sidelink transmissions (block 1110). For example, the UE (such as by using communication manager 140 or reception component 1402, depicted in FIG. 14) may receive, from an encoder device, a network coded sidelink retransmission that includes a set of TBs, the set of TBs associated with one or more sidelink transmissions, as described above.

As further shown in FIG. 11, in some aspects, process 1100 may include transmitting, to a base station, feedback information associated with one or more TBs included in the set of TBs (block 1120). For example, the UE (such as by using communication manager 140 or transmission component 1404, depicted in FIG. 14) may transmit, to a base station, feedback information associated with one or more TBs included in the set of TBs, as described above.

Process 1100 may include additional aspects, such as any single aspect or any combination of aspects described below or in connection with one or more other processes described elsewhere herein.

In a first additional aspect, process 1100 includes receiving, from the encoder device, an indication to transmit the feedback information directly to the base station.

In a second additional aspect, alone or in combination with the first aspect, the indication to transmit the feedback information directly to the base station is included in the network coded sidelink retransmission.

In a third additional aspect, alone or in combination with one or more of the first and second aspects, the indication to transmit the feedback information directly to the base station is included in a header of the network coded sidelink retransmission.

In a fourth additional aspect, alone or in combination with one or more of the first through third aspects, the feedback information is included in a PUCCH message.

In a fifth additional aspect, alone or in combination with one or more of the first through fourth aspects, the feedback information, for a TB of the one or more TBs, includes at least one of ACK/NACK feedback associated with the TB, an identifier associated with an original transmitter of the TB, or an identifier associated with the TB.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
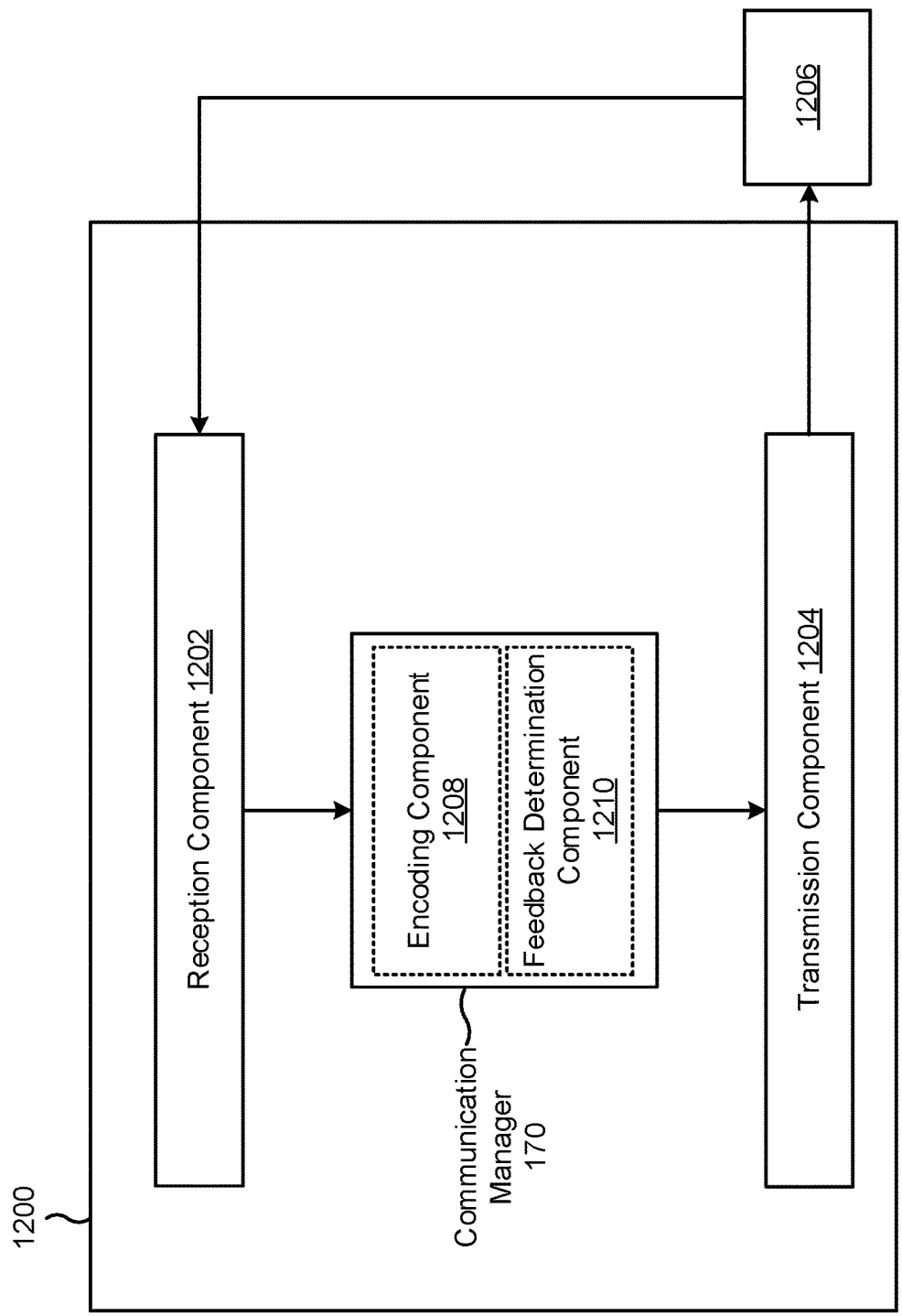
FIGS. 12-14 are diagrams of example apparatuses for wireless communication in accordance with the present disclosure.

FIG. 12 is a diagram of an example apparatus 1200 for wireless communication in accordance with the present disclosure. The apparatus 1200 may be an encoder device, or an encoder device may include the apparatus 1200. In some aspects, the apparatus 1200 includes a reception component 1202, a transmission component 1204, and a communication manager 170, which may be in communication with one another (for example, via one or more buses). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIG. 8. Additionally or alternatively, the apparatus 1200 may be configured to perform one or more processes described herein, such as process 900 of FIG. 9, or a combination thereof. In some aspects, the apparatus 1200 may include one or more components of the encoder device described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 170. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the encoder device described above in connection with FIG. 2.

The transmission component 1204 may transmit communications, such as reference signals, control information, data communications, or a combination thereof, to the apparatus 1206. In some aspects, the communication manager 170 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the encoder device described above in connection with FIG. 2. In some aspects, the transmission component 1204 may be co-located with the reception component 1202 in a transceiver.

The communication manager 170 may transmit or may cause the transmission component 1204 to transmit a network coded sidelink retransmission that is associated with a set of TBs, the set of TBs associated with one or more sidelink transmissions. The communication manager 170 may receive or may cause the reception component 1202 to receive, from one or more UEs, first feedback information, associated with the network coded sidelink retransmission, that indicates whether the one or more UEs successfully decoded the set of TBs. The communication manager 170 may transmit or may cause the transmission component 1204 to transmit, to a base station, second feedback information associated with the network coded sidelink retransmission that is based at least in part on the first feedback information. In some aspects, the communication manager 170 may perform one or more operations described elsewhere herein as being performed by one or more components of the communication manager 170.

The communication manager 170 may include a controller/processor, a memory, a scheduler, a communication unit, or a combination thereof, of the encoder device described above in connection with FIG. 2. In some aspects, the communication manager 170 includes a set of components, such as an encoding component 1208, a feedback determination component 1210, or a combination thereof. Alternatively, the set of components may be separate and distinct from the communication manager 170. In some aspects, one or more components of the set of components may include or may be implemented within a controller/processor, a memory, a scheduler, a communication unit, or a combination thereof, of the encoder device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1204 may transmit a network coded sidelink retransmission that is associated with a set of TBs, the set of TBs associated with one or more sidelink transmissions. The reception component 1202 may receive, from one or more UEs, first feedback information, associated with the network coded sidelink retransmission, that indicates whether the one or more UEs successfully decoded the set of TBs. The transmission component 1204 may transmit, to a base station, second feedback information associated with the network coded sidelink retransmission that is based at least in part on the first feedback information.

The encoding component 1208 may encode the set of TBs to generate the network coded sidelink retransmission.

The feedback determination component 1210 may determine the second feedback information based at least in part on the first feedback information.

The reception component 1202 may receive an indication of a quantity of ACK/NACK feedback indications permitted to be included in the second feedback information.

The transmission component 1204 may transmit, to the base station, an uplink communication that is not associated with the network coded sidelink retransmission, wherein the uplink communication and the second feedback information are included in a same message.

The reception component 1202 may receive, from the base station, an indication of a UE, from the one or more UEs, that is to transmit feedback, associated with the network coded sidelink retransmission, directly to the base station.

The transmission component 1204 may transmit, to the UE, an indication that the UE is to transmit the feedback, associated with the network coded sidelink retransmission, directly to the base station.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
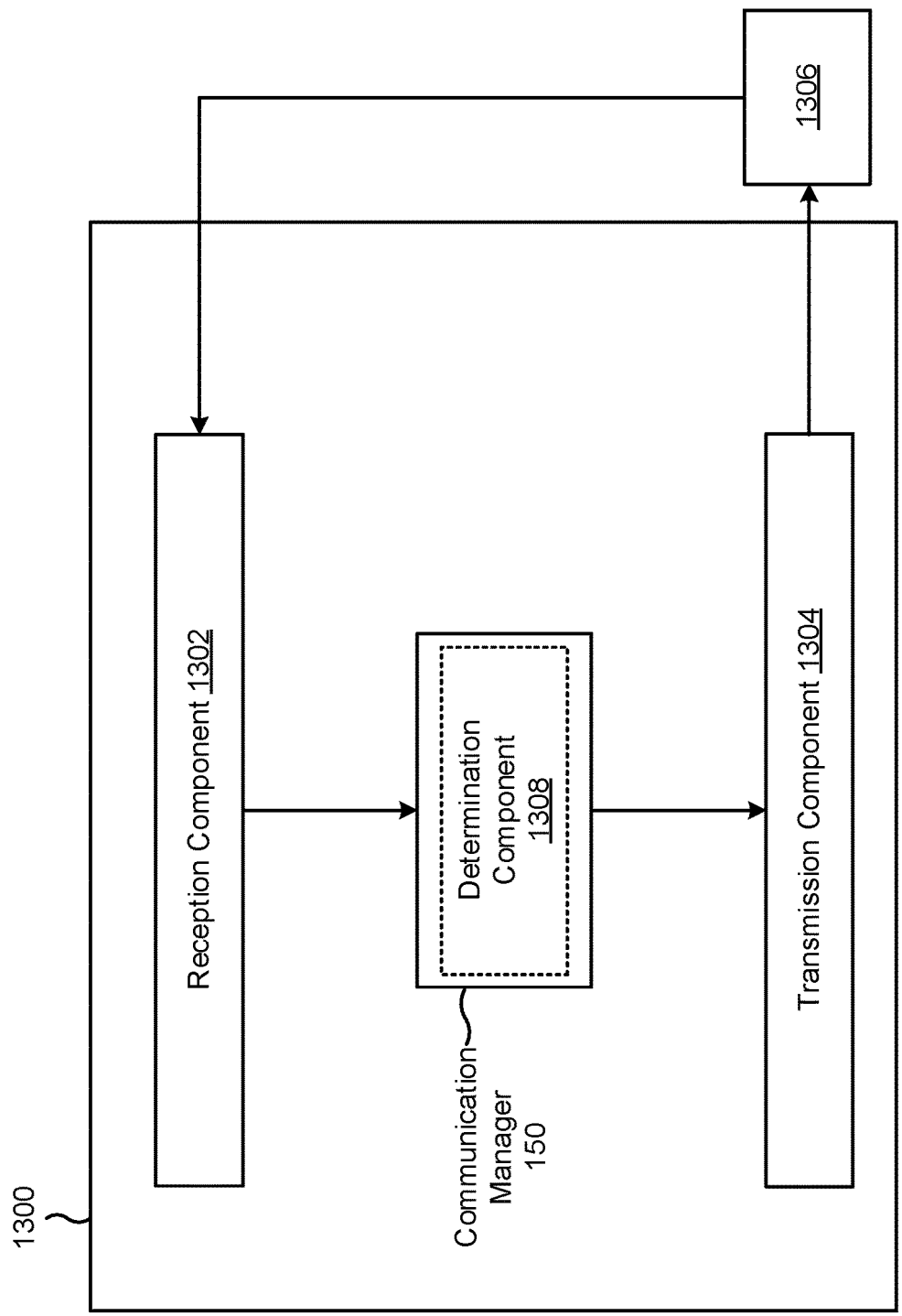

FIG. 13 is a diagram of an example apparatus 1300 for wireless communication in accordance with the present disclosure. The apparatus 1300 may be a base station, or a base station may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIG. 8. Additionally or alternatively, the apparatus 1300 may be configured to perform one or more processes described herein, such as process 1000 of FIG. 10, or a combination thereof. In some aspects, the apparatus 1300 may include one or more components of the base station described above in connection with FIG. 2.

The reception component 1302 may receive communications, such as reference signals, control information, data communications, or a combination thereof, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The communication manager 150 may transmit or may cause the transmission component 1304 to transmit, to an encoder device, an indication of a set of TBs to be encoded for a network coded sidelink retransmission. The communication manager 150 may receive or may cause the reception component 1302 to receive, from the encoder device or a UE, feedback information associated with the network coded sidelink retransmission that indicates whether the one or more UEs, included the UE, successfully decoded the set of TBs. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a determination component 1308, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1304 may transmit, to an encoder device, an indication of a set of TBs to be encoded for a network coded sidelink retransmission. The reception component 1302 may receive, from the encoder device or a UE, feedback information associated with the network coded sidelink retransmission that indicates whether the one or more UEs, included the UE, successfully decoded the set of TBs.

The determination component 1308 may determine the set of TBs to be encoded for the network coded sidelink retransmission.

The transmission component 1304 may transmit, to the encoder device, an indication of a quantity of ACK/NACK feedback indications that are permitted to be included in the feedback information.

The reception component 1302 may receive, from the encoder device, an uplink communication that is not associated with the network coded sidelink retransmission, and the uplink communication and the feedback information are included in a same message.

The transmission component 1304 may transmit, to the encoder device, an indication that the UE is to transmit feedback, associated with the network coded sidelink retransmission, directly to the base station.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
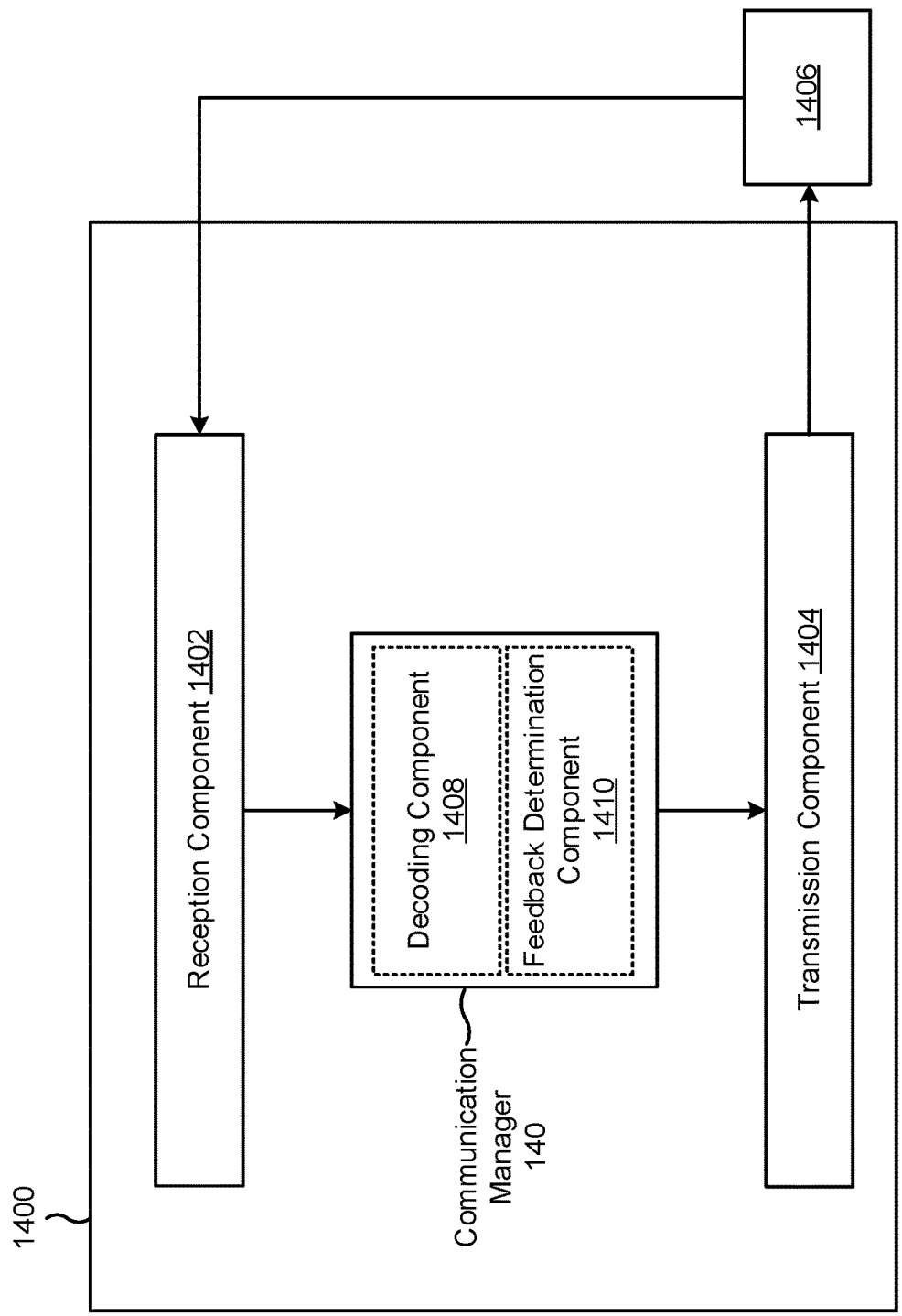

FIG. 14 is a diagram of an example apparatus 1400 for wireless communication in accordance with the present disclosure. The apparatus 1400 may be a UE, or a UE may include the apparatus 1400. In some aspects, the apparatus 1400 includes a reception component 1402, a transmission component 1404, and a communication manager 140, which may be in communication with one another (for example, via one or more buses). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIG. 8. Additionally or alternatively, the apparatus 1400 may be configured to perform one or more processes described herein, such as process 1100 of FIG. 11, or a combination thereof. In some aspects, the apparatus 1400 may include one or more components of the UE described above in connection with FIG. 2.

The reception component 1402 may receive communications, such as reference signals, control information, data communications, or a combination thereof, from the apparatus 1406. The reception component 1402 may provide received communications to one or more other components of the apparatus 1400, such as the communication manager 140. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, the communication manager 140 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The communication manager 140 may receive or may cause the reception component 1402 to receive, from an encoder device, a network coded sidelink retransmission that includes a set of TBs, the set of TBs associated with one or more sidelink transmissions. The communication manager 140 may transmit or may cause the transmission component 1404 to transmit, to a base station, feedback information associated with one or more TBs included in the set of TBs. In some aspects, the communication manager 140 may perform one or more operations described elsewhere herein as being performed by one or more components of the communication manager 140.

The communication manager 140 may include a controller/processor, a memory, a scheduler, a communication unit, or a combination thereof, of the UE described above in connection with FIG. 2. In some aspects, the communication manager 140 includes a set of components, such as a decoding component 1408, a feedback determination component 1410, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive, from an encoder device, a network coded sidelink retransmission that includes a set of TBs, the set of TBs associated with one or more sidelink transmissions. The transmission component 1404 may transmit, to a base station, feedback information associated with one or more TBs included in the set of TBs.

The decoding component 1408 may decode the network coded sidelink retransmission to obtain one or more TBs included in the set of TBs. The feedback determination component 1410 may determine the feedback information based at least in part on decoding the network coded sidelink retransmission.

The reception component 1402 may receive, from the encoder device, an indication to transmit the feedback information directly to the base station.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by an encoder device, comprising: transmitting a network coded sidelink retransmission that is associated with a set of transport blocks (TBs), the set of TBs associated with one or more sidelink transmissions; receiving, from one or more user equipments (UEs), first feedback information, associated with the network coded sidelink retransmission, that indicates whether the one or more UEs successfully decoded the set of TBs; and transmitting, to a base station, second feedback information associated with the network coded sidelink retransmission that is based at least in part on the first feedback information.

Aspect 2: The method of Aspect 1, wherein the second feedback information, for each TB of the set of TBs, includes a separate indication for each UE, included in the one or more UEs, indicating whether the UE successfully decoded the TB.

Aspect 3: The method of Aspect 2, wherein the second feedback information is included in a physical uplink shared channel (PUSCH) message.

Aspect 4: The method of any of Aspects 1-3, wherein the first feedback information includes acknowledgement (ACK) or negative acknowledgment (NACK) (ACK/NACK) feedback, associated with a UE, of the one or more UEs, and associated with an TB of the set of TBs, and wherein the second feedback information includes at least one of: an indication of the ACK/NACK feedback, an identifier of an original transmitter associated with the TB, an identifier of the TB, or an identifier of the UE.

Aspect 5: The method of any of Aspects 1-4, wherein the second feedback information includes an indication of whether the base station is to provide feedback associated with the second feedback information.

Aspect 6: The method of any of Aspects 1-5, wherein the second feedback information can include up to a quantity of acknowledgement (ACK) or negative acknowledgment (NACK) (ACK/NACK) feedback indications associated with the network coded sidelink retransmission.

Aspect 7: The method of Aspect 6, further comprising receiving an indication of the quantity of ACK/NACK feedback indications.

Aspect 8: The method of any of Aspects 1-7, further comprising transmitting, to the base station, an uplink communication that is not associated with the network coded sidelink retransmission, wherein the uplink communication and the second feedback information are included in a same message.

Aspect 9: The method of any of Aspects 1-8, wherein the transmission of the second feedback information is triggered based at least in part on receiving the first feedback information.

Aspect 10: The method of any of Aspects 1-9, wherein transmitting the second feedback information is based at least in part on an amount of time after transmitting the network coded sidelink retransmission satisfying a threshold.

Aspect 11: The method of any of Aspects 1-10, wherein transmitting the second feedback information is based at least in part on a periodic schedule.

Aspect 12: The method of any of Aspects 1-11, wherein the second feedback information includes a separate indication for each TB, of the set of TBs, and wherein the separate indication is associated with each UE of the one or more UEs.

Aspect 13: The method of Aspect 12, wherein the second feedback information is included in a physical uplink control channel (PUCCH) message.

Aspect 14: The method of any of Aspects 1-13, wherein the second feedback information includes an acknowledgement (ACK) indication for an TB, of the set of TBs, based at least in part on the first feedback information indicating ACK indications, associated with the TB, from all of the one or more UEs.

Aspect 15: The method of any of Aspects 1-14, wherein the second feedback information includes an acknowledgement (ACK) indication for an TB, of the set of TBs, based at least in part on a quantity of ACK indications, included in the first feedback information and associated with the TB, satisfying a threshold.

Aspect 16: The method of any of Aspects 1-15, wherein the second feedback information includes an acknowledgement (ACK) indication for an TB, of the set of TBs, based at least in part on a ratio of ACK indications, included in the first feedback information and associated with the TB, to negative acknowledgement (NACK) indications, included in the first feedback information and associated with the TB, satisfying a threshold.

Aspect 17: The method of any of Aspects 1-16, wherein the second feedback information includes a single acknowledgement (ACK) or negative acknowledgment (NACK) (ACK/NACK) feedback indication associated with the network coded sidelink retransmission and the set of TBs.

Aspect 18: The method of Aspect 17, wherein the single ACK/NACK feedback indication is associated with ACK feedback based at least in part on the first feedback information indicating that each TB, of the set of TBs, was successfully decoded by all of the one or more UEs.

Aspect 19: The method of any of Aspects 17-18, wherein the single ACK/NACK feedback indication is associated with ACK feedback based at least in part on a quantity of TBs, indicated by the first feedback information, that were successfully decoded satisfying a threshold.

Aspect 20: The method of any of Aspects 17-19, wherein the single ACK/NACK feedback indication is associated with ACK feedback based at least in part on a quantity of failed decodings, indicated by the first feedback information for the one or more UEs, satisfying a threshold.

Aspect 21: The method of any of Aspects 17-20, wherein the single ACK/NACK feedback indication is associated with ACK feedback based at least in part on a quantity of retransmissions associated with the one or more TBs, included in the set of TBs, satisfying a threshold.

Aspect 22: The method of any of Aspects 17-21, wherein the single ACK/NACK feedback indication is associated with NACK feedback, the method further comprising: receiving, from the base station, an indication of sidelink resources to be used to retransmit the network coded sidelink retransmission based at least in part on the single ACK/NACK feedback indication being associated with NACK feedback.

Aspect 23: The method of any of Aspects 1-22, further comprising: receiving, from the base station, an indication of a UE, from the one or more UEs, that is to transmit feedback, associated with the network coded sidelink retransmission, directly to the base station; and transmitting, to the UE, an indication that the UE is to transmit the feedback, associated with the network coded sidelink retransmission, directly to the base station.

Aspect 24: The method of Aspect 23, wherein the indication that the UE is to transmit the feedback directly to the base station is included in a header of the network coded sidelink retransmission.

Aspect 25: A method of wireless communication performed by a base station, comprising: transmitting, to an encoder device, an indication of a set of transport blocks (TBs) to be encoded for a network coded sidelink retransmission; and receiving, from the encoder device or a user equipment (UE), feedback information associated with the network coded sidelink retransmission that indicates whether the one or more UEs, included the UE, successfully decoded the set of TBs.

Aspect 26: The method of Aspect 25, wherein the feedback information, for each TB of the set of TBs, includes a separate indication for each UE, included in the one or more UEs, indicating whether the UE successfully decoded the TB.

Aspect 27: The method of Aspect 26, wherein the feedback information is included in a physical uplink shared channel (PUSCH) message.

Aspect 28: The method of any of Aspects 25-27, wherein the feedback information includes at least one of: an indication of acknowledgement (ACK) or negative acknowledgment (NACK) (ACK/NACK) feedback for a TB of the set of TBs, an identifier of an original transmitter associated with the TB, an identifier of the TB, or an identifier of a UE associated with the ACK/NACK feedback.

Aspect 29: The method of any of Aspects 25-28, wherein the feedback information includes an indication of whether the base station is to provide feedback associated with the feedback information.

Aspect 30: The method of any of Aspects 25-29, wherein the feedback information can include up to quantity of acknowledgement (ACK) or negative acknowledgment (NACK) (ACK/NACK) feedback indications associated with the network coded sidelink retransmission.

Aspect 31: The method of Aspect 30, further comprising transmitting, to the encoder device, an indication of the quantity of ACK/NACK feedback indications.

Aspect 32: The method of any of Aspects 25-31, further comprising receiving, from the encoder device, an uplink communication that is not associated with the network coded sidelink retransmission, wherein the uplink communication and the feedback information are included in a same message.

Aspect 33: The method of any of Aspects 25-32, wherein the feedback information includes a separate indication for each TB, of the set of TBs, and wherein the separate indication is associated with each UE of the one or more UEs.

Aspect 34: The method of Aspect 33, wherein the feedback information is included in a physical uplink control channel (PUCCH) message.

Aspect 35: The method of any of Aspects 25-34, wherein the feedback information includes a single acknowledgement (ACK) or negative acknowledgment (NACK) (ACK/NACK) feedback indication associated with the network coded sidelink retransmission and the set of TBs.

Aspect 36: The method of Aspect 35, wherein the single ACK/NACK feedback indication is associated with ACK feedback based at least in part on each TB, of the set of TBs, being successfully decoded by all of the one or more UEs.

Aspect 37: The method of any of Aspects 35-36, wherein the single ACK/NACK feedback indication is associated with ACK feedback based at least in part on a quantity of TBs that were successfully decoded satisfying a threshold.

Aspect 38: The method of any of Aspects 35-37, wherein the single ACK/NACK feedback indication is associated with ACK feedback based at least in part on a quantity of failed decodings of the set of TBs by the one or more UEs satisfying a threshold.

Aspect 39: The method of any of Aspects 35-38, wherein the single ACK/NACK feedback indication is associated with ACK feedback based at least in part on a quantity of retransmissions associated with one or more TBs, included in the set of TBs, satisfying a threshold.

Aspect 40: The method of any of Aspects 35-39, wherein the single ACK/NACK feedback indication is associated with NACK feedback, the method further comprising: transmitting, to the encoder device, an indication of sidelink resources to be used to retransmit the network coded sidelink retransmission based at least in part on the single ACK/NACK feedback indication being associated with NACK feedback.

Aspect 41: The method of any of Aspects 25-40, further comprising: transmitting, to the encoder device, an indication that the UE is to transmit feedback, associated with the network coded sidelink retransmission, directly to the base station.

Aspect 42: The method of any of Aspects 25-41, wherein receiving the feedback information comprises receiving, from the UE, an indication of at least one of: acknowledgement (ACK) or negative acknowledgment (NACK) (ACK/NACK) feedback associated with a TB included in the set of TBs, an identifier associated with an original transmitter of the TB, or an identifier associated with the TB.

Aspect 43: The method of Aspect 42, wherein the feedback information is included in a physical uplink control channel (PUCCH) message.

Aspect 44: A method of wireless communication performed by a user equipment (UE), comprising: receiving, from an encoder device, a network coded sidelink retransmission that includes a set of transport blocks (TBs), the set of TBs associated with one or more sidelink transmissions; and transmitting, to a base station, feedback information associated with one or more TBs included in the set of TBs.

Aspect 45: The method of Aspect 44, further comprising receiving, from the encoder device, an indication to transmit the feedback information directly to the base station.

Aspect 46: The method of Aspect 45, wherein the indication to transmit the feedback information directly to the base station is included in the network coded sidelink retransmission.

Aspect 47: The method of any of Aspects 45-46, wherein the indication to transmit the feedback information directly to the base station is included in a header of the network coded sidelink retransmission.

Aspect 48: The method of any of Aspects 44-47, wherein the feedback information is included in a physical uplink control channel (PUCCH) message.

Aspect 49: The method of any of Aspects 44-48, wherein the feedback information, for a TB of the one or more TBs, includes at least one of: acknowledgement (ACK) or negative acknowledgment (NACK) (ACK/NACK) feedback associated with the TB, an identifier associated with an original transmitter of the TB, or an identifier associated with the TB.

Aspect 50: An apparatus for wireless communication at a device, comprising a processor; memory coupled with the processor; and instructions stored in the memory and executable by the processor to cause the apparatus to perform the method of one or more of Aspects 1-24.

Aspect 51: A device for wireless communication, comprising a memory and one or more processors coupled to the memory, the one or more processors configured to perform the method of one or more of Aspects 1-24.

Aspect 52: An apparatus for wireless communication, comprising at least one means for performing the method of one or more of Aspects 1-24.

Aspect 53: A non-transitory computer-readable medium storing code for wireless communication, the code comprising instructions executable by a processor to perform the method of one or more of Aspects 1-24.

Aspect 54: A non-transitory computer-readable medium storing a set of instructions for wireless communication, the set of instructions comprising one or more instructions that, when executed by one or more processors of a device, cause the device to perform the method of one or more of Aspects 1-24.

Aspect 55: An apparatus for wireless communication at a device, comprising a processor; memory coupled with the processor; and instructions stored in the memory and executable by the processor to cause the apparatus to perform the method of one or more of Aspects 25-43.

Aspect 56: A device for wireless communication, comprising a memory and one or more processors coupled to the memory, the one or more processors configured to perform the method of one or more of Aspects 25-43.

Aspect 57: An apparatus for wireless communication, comprising at least one means for performing the method of one or more of Aspects 25-43.

Aspect 58: A non-transitory computer-readable medium storing code for wireless communication, the code comprising instructions executable by a processor to perform the method of one or more of Aspects 25-43.

Aspect 59: A non-transitory computer-readable medium storing a set of instructions for wireless communication, the set of instructions comprising one or more instructions that, when executed by one or more processors of a device, cause the device to perform the method of one or more of Aspects 25-43.

Aspect 60: An apparatus for wireless communication at a device, comprising a processor; memory coupled with the processor; and instructions stored in the memory and executable by the processor to cause the apparatus to perform the method of one or more of Aspects 44-49.

Aspect 61: A device for wireless communication, comprising a memory and one or more processors coupled to the memory, the one or more processors configured to perform the method of one or more of Aspects 44-49.

Aspect 62: An apparatus for wireless communication, comprising at least one means for performing the method of one or more of Aspects 44-49.

Aspect 63: A non-transitory computer-readable medium storing code for wireless communication, the code comprising instructions executable by a processor to perform the method of one or more of Aspects 44-49.

Aspect 64: A non-transitory computer-readable medium storing a set of instructions for wireless communication, the set of instructions comprising one or more instructions that, when executed by one or more processors of a device, cause the device to perform the method of one or more of Aspects 44-49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An encoder device for wireless communication, comprising:
    at least one processor; and
    at least one memory communicatively coupled with the at least one processor and storing processor-readable code that, when executed by the at least one processor, is configured to cause the encoder device to:
        transmit a network coded sidelink retransmission that is associated with a set of transport blocks (TBs), the set of TBs associated with one or more sidelink transmissions associated with a plurality of user equipments (UEs);
        receive, from one or more UEs of the plurality of UEs, first feedback information, associated with the network coded sidelink retransmission, that indicates whether the one or more UEs successfully decoded the set of TBs; and
        transmit, to a base station, second feedback information associated with the network coded sidelink retransmission that is based at least in part on the first feedback information.

2. The encoder device of claim 1, wherein the second feedback information, for each TB of the set of TBs, includes a separate indication for each UE, included in the one or more UEs, indicating whether the UE successfully decoded the TB.

3. The encoder device of claim 1, wherein the first feedback information includes acknowledgement (ACK) or negative acknowledgment (NACK) (ACK/NACK) feedback, associated with a UE, of the one or more UEs, and associated with an TB of the set of TBs, and wherein the second feedback information includes at least one of:
    an indication of the ACK/NACK feedback, an identifier of an original transmitter associated with the TB,
an identifier of the TB, or
an identifier of the UE.

4. The encoder device of claim 1, wherein the at least one memory further stores processor-readable code configured to cause the encoder device to transmit, to the base station, an uplink communication that is not associated with the network coded sidelink retransmission, wherein the uplink communication and the second feedback information are included in a same message.

5. The encoder device of claim 1, wherein the second feedback information includes a separate indication for each TB, of the set of TBs, and wherein the separate indication is associated with each UE of the one or more UEs.

6. The encoder device of claim 1, wherein the second feedback information includes an acknowledgement (ACK) indication for an TB, of the set of TBs, based at least in part on at least one of:
the first feedback information indicating ACK indications, associated with the TB, from all of the one or more UEs;
a quantity of ACK indications, included in the first feedback information and associated with the TB, satisfying a threshold; or
a ratio of ACK indications, included in the first feedback information and associated with the TB, to negative acknowledgement (NACK) indications, included in the first feedback information and associated with the TB, satisfying a threshold.

7. The encoder device of claim 1, wherein the second feedback information includes a single acknowledgement (ACK) or negative acknowledgment (NACK) (ACK/NACK) feedback indication associated with the network coded sidelink retransmission and the set of TBs.

8. The encoder device of claim 7, wherein the single ACK/NACK feedback indication is associated with ACK feedback based at least in part on at least one of:
the first feedback information indicating that each TB, of the set of TBs, was successfully decoded by all of the one or more UEs;
a quantity of TBs, indicated by the first feedback information, that were successfully decoded satisfying a threshold;
a quantity of failed decodings, indicated by the first feedback information for the one or more UEs, satisfying a threshold; or
a quantity of retransmissions associated with the one or more TBs, included in the set of TBs, satisfying a threshold.

9. The encoder device of claim 1, wherein the at least one memory further stores processor-readable code configured to cause the encoder device to:
receive, from the base station, an indication of a UE, from the one or more UEs, that is to transmit feedback, associated with the network coded sidelink retransmission, directly to the base station; and
transmit, to the UE, an indication that the UE is to transmit the feedback, associated with the network coded sidelink retransmission, directly to the base station.

10. A base station for wireless communication, comprising:
at least one processor; and
at least one memory communicatively coupled with the at least one processor and storing processor-readable code that, when executed by the at least one processor, is configured to cause the base station to:
transmit, to an encoder device, an indication of a set of transport blocks (TBs), associated with one or more sidelink transmissions associated with a plurality of user equipments (UEs), to be encoded by the encoder device for a network coded sidelink retransmission; and
receive, from the encoder device or one or more UEs of the plurality of UEs, feedback information associated with the network coded sidelink retransmission that indicates whether the one or more UEs of the plurality of UEs successfully decoded the set of TBs.

11. The base station of claim 10, wherein the feedback information includes at least one of:
an indication of acknowledgement (ACK) or negative acknowledgment (NACK) (ACK/NACK) feedback for a TB of the set of TBs,
an identifier of an original transmitter associated with the TB,
an identifier of the TB, or
an identifier of a UE, of the one or more UEs, associated with the ACK/NACK feedback.

12. The base station of claim 10, wherein the feedback information includes an indication of whether the base station is to provide feedback associated with the feedback information.

13. The base station of claim 10, wherein the feedback information includes a separate indication for each TB, of the set of TBs, and wherein the separate indication is associated with each UE of the one or more UEs.

14. The base station of claim 10, wherein the feedback information includes a single acknowledgement (ACK) or negative acknowledgment (NACK) (ACK/NACK) feedback indication associated with the network coded sidelink retransmission and the set of TBs.

15. The base station of claim 10, wherein, to cause the base station to receive the feedback information, the processor-readable code, when executed by the at least one processor, is configured to cause the base station to receive, from the one or more UEs, an indication of at least one of:
acknowledgement (ACK) or negative acknowledgment (NACK) (ACK/NACK) feedback associated with a TB included in the set of TBs,
an identifier associated with an original transmitter of the TB, or
an identifier associated with the TB.

16. A method of wireless communication performed by an encoder device, comprising:
transmitting a network coded sidelink retransmission that is associated with a set of transport blocks (TBs), the set of TBs associated with one or more sidelink transmissions associated with a plurality of user equipments (UEs);
receiving, from one or more UEs of the plurality of UEs, first feedback information, associated with the network coded sidelink retransmission, that indicates whether the one or more UEs successfully decoded the set of TBs; and
transmitting, to a base station, second feedback information associated with the network coded sidelink retransmission that is based at least in part on the first feedback information.

17. The method of claim 16, wherein the second feedback information, for each TB of the set of TBs, includes a separate indication for each UE, included in the one or more UEs, indicating whether the UE successfully decoded the TB.

18. The method of claim 16, wherein the first feedback information includes acknowledgement (ACK) or negative acknowledgment (NACK) (ACK/NACK) feedback, associated with a UE, of the one or more UEs, and associated with an TB of the set of TBs, and wherein the second feedback information includes at least one of:
an indication of the ACK/NACK feedback,
an identifier of an original transmitter associated with the TB,
an identifier of the TB, or
an identifier of the UE.

19. The method of claim 16, further comprising transmitting, to the base station, an uplink communication that is not associated with the network coded sidelink retransmission, wherein the uplink communication and the second feedback information are included in a same message.

20. The method of claim 16, wherein the second feedback information includes a separate indication for each TB, of the set of TBs, and wherein the separate indication is associated with each UE of the one or more UEs.

21. The method of claim 16, wherein the second feedback information includes an acknowledgement (ACK) indication for an TB, of the set of TBs, based at least in part on at least one of:
the first feedback information indicating ACK indications, associated with the TB, from all of the one or more UEs;
a quantity of ACK indications, included in the first feedback information and associated with the TB, satisfying a threshold; or
a ratio of ACK indications, included in the first feedback information and associated with the TB, to negative acknowledgement (NACK) indications, included in the first feedback information and associated with the TB, satisfying a threshold.

22. The method of claim 16, wherein the second feedback information includes a single acknowledgement (ACK) or negative acknowledgment (NACK) (ACK/NACK) feedback indication associated with the network coded sidelink retransmission and the set of TBs.

23. The method of claim 22, wherein the single ACK/NACK feedback indication is associated with ACK feedback based at least in part on at least one of:
the first feedback information indicating that each TB, of the set of TBs, was successfully decoded by all of the one or more UEs;
a quantity of TBs, indicated by the first feedback information, that were successfully decoded satisfying a threshold;
a quantity of failed decodings, indicated by the first feedback information for the one or more UEs, satisfying a threshold; or
a quantity of retransmissions associated with the one or more TBs, included in the set of TBs, satisfying a threshold.

24. The method of claim 16, further comprising:
receiving, from the base station, an indication of a UE, from the one or more UEs, that is to transmit feedback, associated with the network coded sidelink retransmission, directly to the base station; and
transmitting, to the UE, an indication that the UE is to transmit the feedback, associated with the network coded sidelink retransmission, directly to the base station.

25. A method of wireless communication performed by a base station, comprising:
transmitting, to an encoder device, an indication of a set of transport blocks (TBs), associated with one or more sidelink transmissions associated with a plurality of user equipments (UEs), to be encoded by the encoder device for a network coded sidelink retransmission; and
receiving, from the encoder device or one or more UEs of the plurality of UEs, feedback information associated with the network coded sidelink retransmission that indicates whether the one or more UEs of the plurality of UEs successfully decoded the set of TBs.

26. The method of claim 25, wherein the feedback information includes at least one of:
an indication of acknowledgement (ACK) or negative acknowledgment (NACK) (ACK/NACK) feedback for a TB of the set of TBs,
an identifier of an original transmitter associated with the TB,
an identifier of the TB, or
an identifier of a UE, of the one or more UEs, associated with the ACK/NACK feedback.

27. The method of claim 25, wherein the feedback information includes an indication of whether the base station is to provide feedback associated with the feedback information.

28. The method of claim 25, wherein the feedback information includes a separate indication for each TB, of the set of TBs, and wherein the separate indication is associated with each UE of the one or more UEs.

29. The method of claim 25, wherein the feedback information includes a single acknowledgement (ACK) or negative acknowledgment (NACK) (ACK/NACK) feedback indication associated with the network coded sidelink retransmission and the set of TBs.

30. The method of claim 25, wherein receiving the feedback information comprises receiving, from the one or more UEs, an indication of at least one of:
acknowledgement (ACK) or negative acknowledgment (NACK) (ACK/NACK) feedback associated with a TB included in the set of TBs,
an identifier associated with an original transmitter of the TB, or an identifier associated with the TB.

* * * * *